US009335529B2

(12) United States Patent
Shiraishi

(10) Patent No.: US 9,335,529 B2
(45) Date of Patent: May 10, 2016

(54) CATOPTRIC ARRAY WITH SPATIAL FILTER

(71) Applicant: Toshiba Tec Kabushiki Kaisha, Tokyo (JP)

(72) Inventor: Takashi Shiraishi, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 45 days.

(21) Appl. No.: 13/901,234

(22) Filed: May 23, 2013

(65) Prior Publication Data

US 2013/0314797 A1      Nov. 28, 2013

(30) Foreign Application Priority Data

May 23, 2012   (JP) .................................. 2012-117730

(51) Int. Cl.
  *G02B 17/00*   (2006.01)
  *G02B 17/08*   (2006.01)
  *G02B 3/00*    (2006.01)
  *G02B 26/10*   (2006.01)

(52) U.S. Cl.
  CPC ............ *G02B 17/002* (2013.01); *G02B 3/0056* (2013.01); *G02B 17/008* (2013.01); *G02B 17/0856* (2013.01); *G02B 26/101* (2013.01)

(58) Field of Classification Search
  CPC .. G02B 17/0663; G02B 17/02; G02B 17/002; G02B 17/006; G02B 17/008; G02B 17/0856; G06Q 30/20; G06F 3/04
  USPC ..................... 358/1.15, 1.13; 506/9; 382/131; 435/6.11
  See application file for complete search history.

(56) References Cited

U.S. PATENT DOCUMENTS

| | | | | |
|---|---|---|---|---|
| 1,153,259 | A * | 9/1915 | Saegmuller | 359/404 |
| 3,140,339 | A * | 7/1964 | Nisperly et al. | 359/862 |
| 3,443,105 | A * | 5/1969 | Scidmore et al. | 250/214 VT |
| 3,748,015 | A * | 7/1973 | Offner | 359/366 |
| 4,173,394 | A * | 11/1979 | Clave et al. | 359/669 |

(Continued)

FOREIGN PATENT DOCUMENTS

| | | |
|---|---|---|
| JP | H04085513 A | 3/1992 |
| JP | H04085514 A | 3/1992 |

(Continued)

OTHER PUBLICATIONS

Wolf, K. B., & Krotzsch, G. (1995). Geometry and dynamics in refracting systems. European Journal of Physics, 16(1), 14-20.*
Japanese Office Action dated Apr. 22, 2014, filed in Japanese counterpart Application No. 2012-117730, 7 pages (with translation).

*Primary Examiner* — Jordan Schwartz
*Assistant Examiner* — George G King
(74) *Attorney, Agent, or Firm* — Patterson & Sheridan, LLP

(57) ABSTRACT

According to one embodiment, the imaging device array in an embodiment has plural imaging devices formed integrally, imaging the light that is output from the exit surface imaged at the image point including an incidence surface for the incidence of light, plural reflective surfaces including four reflective surfaces for reflecting the light from the incidence surface, and an exit surface that outputs light that has gone through the plural reflective surfaces, in which the plural imaging devices are arranged as an array, and a surface for ameliorating the propagation of light other than the light reflected from the reflective surfaces to the exit surface is formed on the periphery of at least one reflective surface among the plural reflective surfaces.

11 Claims, 30 Drawing Sheets

(56) References Cited

U.S. PATENT DOCUMENTS

| | | | |
|---|---|---|---|
| 6,781,103 B1* | 8/2004 | Lane et al. | 250/201.4 |
| 7,317,530 B2* | 1/2008 | Liphardt et al. | 356/369 |
| 8,780,157 B2* | 7/2014 | Shiraishi | 347/244 |
| 2003/0016926 A1* | 1/2003 | Hofstadler et al. | 385/125 |
| 2006/0198039 A1* | 9/2006 | Sasaki | 359/857 |
| 2008/0259447 A1* | 10/2008 | Oppenheimer | 359/399 |
| 2012/0200900 A1* | 8/2012 | Takeda et al. | 358/484 |
| 2013/0100514 A1* | 4/2013 | Shiraishi | 359/201.1 |

FOREIGN PATENT DOCUMENTS

| | | |
|---|---|---|
| JP | H10082972 A | 3/1998 |
| JP | H10153751 A | 6/1998 |
| JP | H11183840 A | 7/1999 |
| JP | 2002178555 A | 6/2002 |
| JP | 2005-070519 | 3/2005 |

* cited by examiner

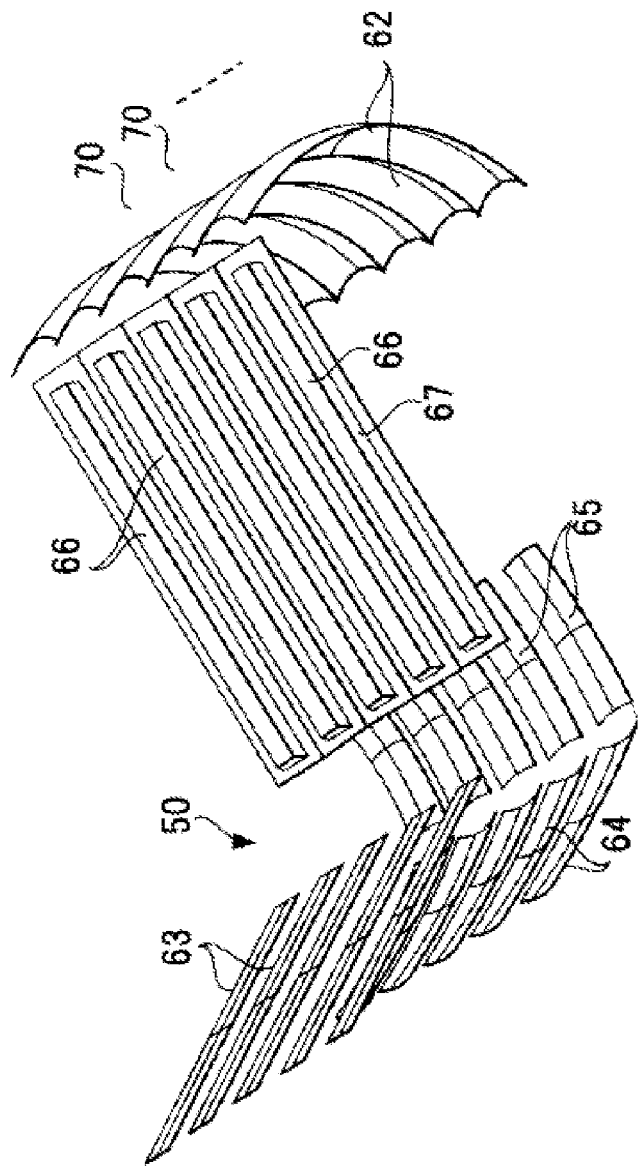
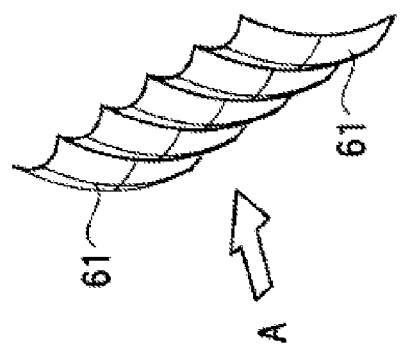
FIG. 6A

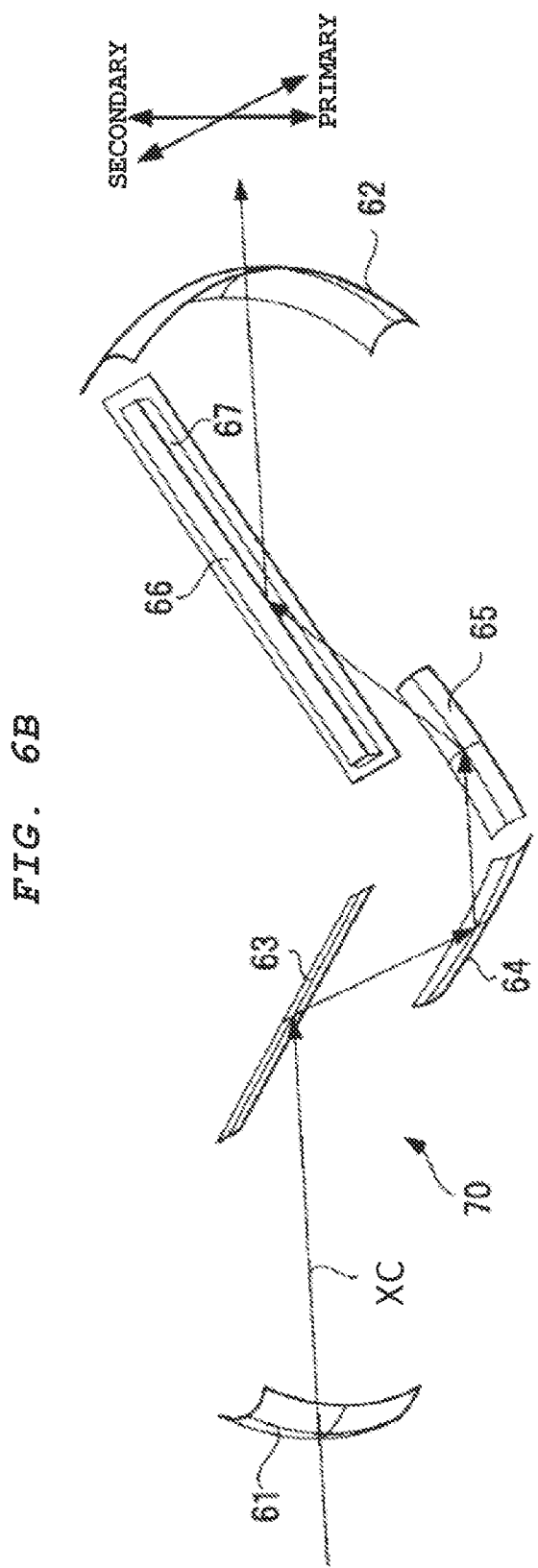

PRIMARY SCANNING DIRECTION

PRIMARY SCANNING DIRECTION

PRIMARY SCANNING DIRECTION

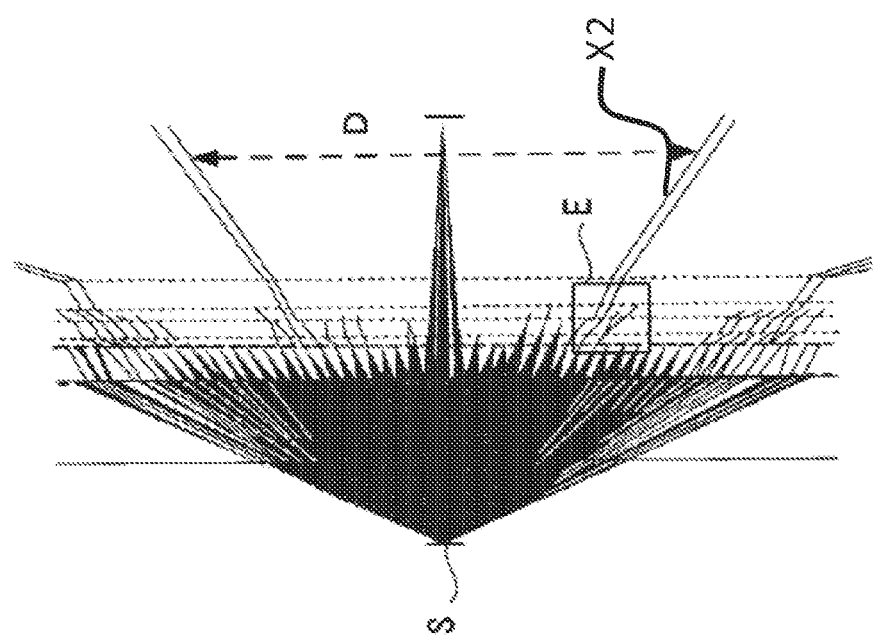

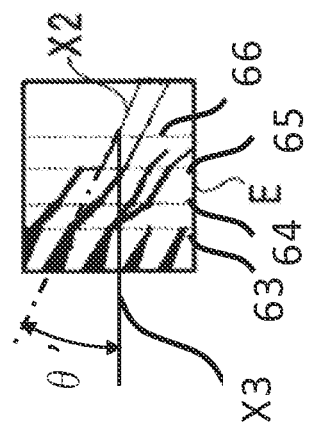

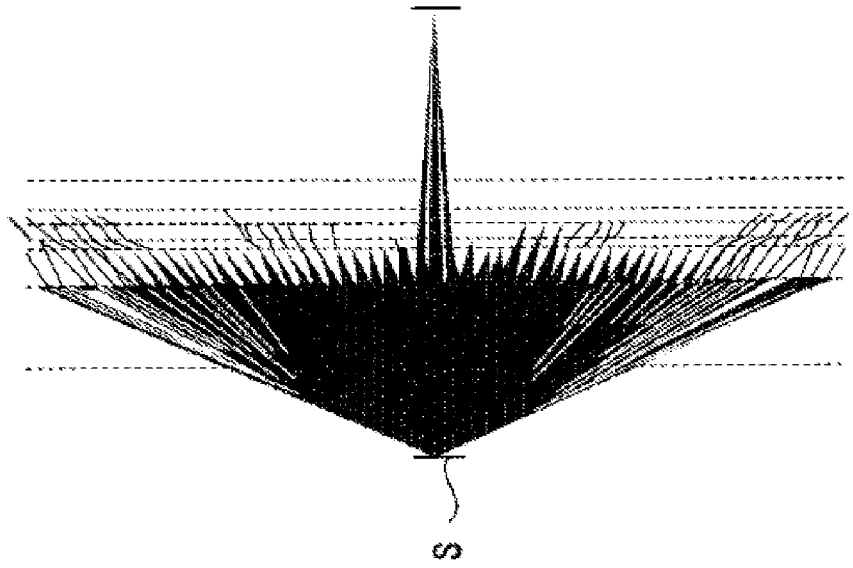

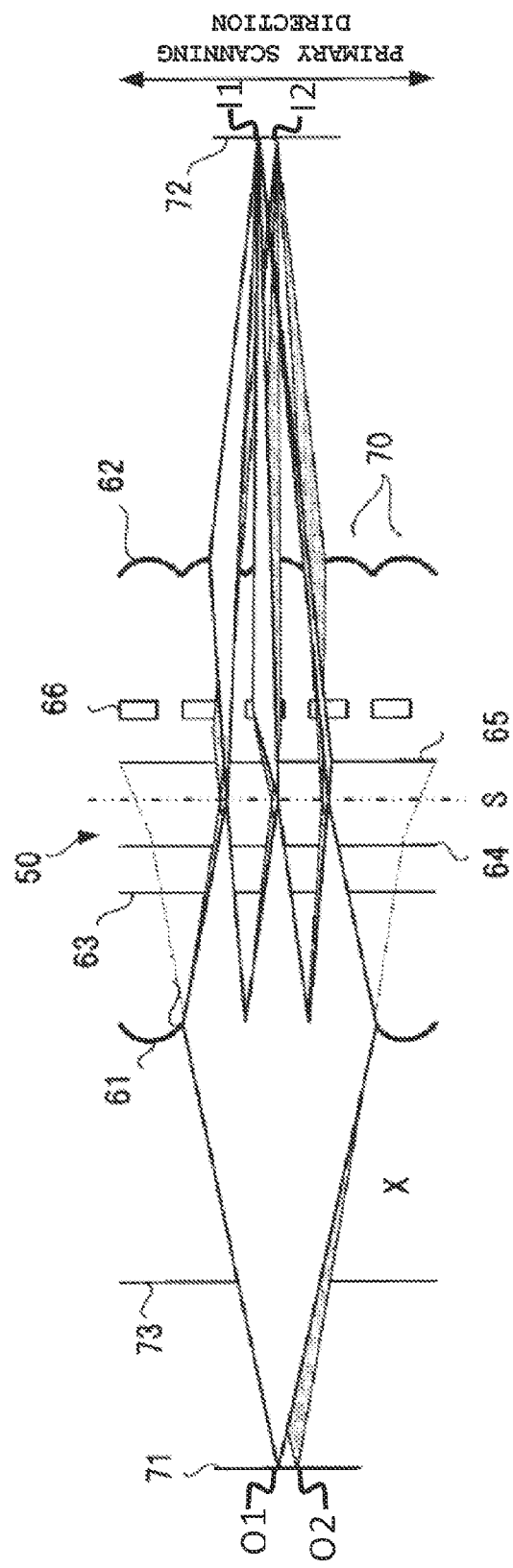

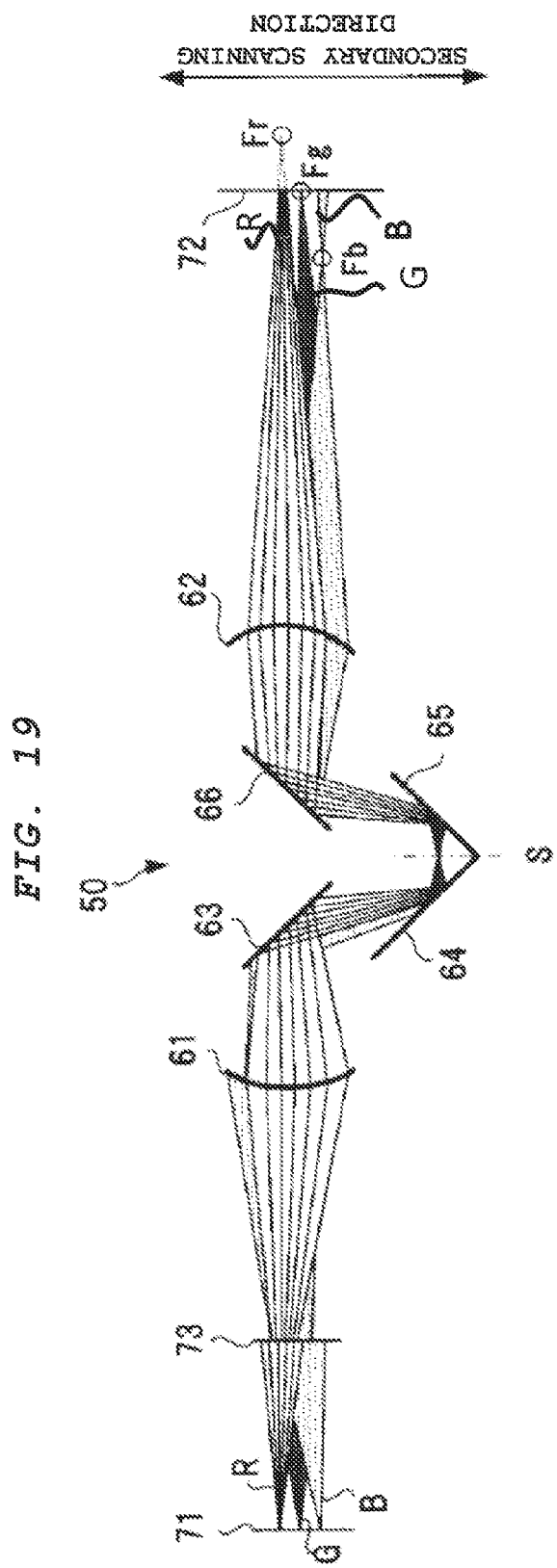

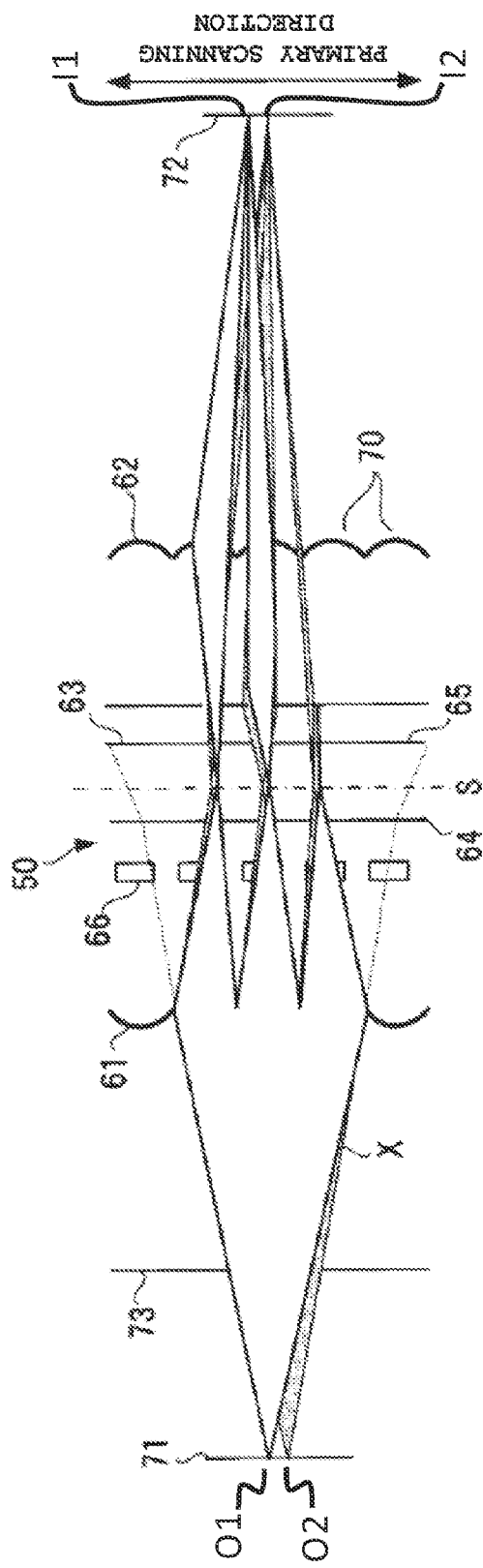

CATOPTRIC ARRAY WITH SPATIAL FILTER

CROSS-REFERENCE TO RELATED APPLICATION

This application is based upon and claims the benefit of priority from Japanese Patent Application No. 2012-117730, filed May 23, 2012; the entire contents of which are incorporated herein by reference.

FIELD

The embodiments described herein relate to an imaging device array including lenses and mirrors, and an image forming apparatus using the imaging device array.

BACKGROUND

Conventionally, in image forming apparatuses such as scanners, copiers, and multifunction peripherals (MFP), with an illuminating apparatus and a lens array having plural lenses arranged in the array, an image formed on an original document is focused onto an image sensor where the image is read or "imaged" to be read. In addition, in printers, copiers, multifunction peripherals (MFP), or other image forming apparatuses, an LED or other light emitting device and a lens array are used to cause the light rays from the LED pass through the lens array to form an image on a photoreceptor drum (exposure). Here, the lens array is formed as a combination of lenses and apertures.

However, for the lens array, if the optical axis of the different lenses that are used for the passing of a light rays are offset from each other, the resulting unevenness in the imaging characteristics and the light quantity degrades the image significantly. Also, when plural lenses, mirrors and apertures are combined to form the imaging optics, misalignment during the assembly of the imaging optics leads to degradation in the performance of, and a rise in the manufacturing cost of, the image forming apparatus.

DESCRIPTION OF THE DRAWINGS

FIGS. 6A and 6B are schematic perspective views illustrating the configuration of the imaging device array according to an embodiment.

FIGS. 15A to 15C are diagrams illustrating the state of generating stray light corresponding to the yes/no of a protrusion on the mirror surface.

FIG. 18 is a diagram illustrating the optical path of the image forming device array according to an embodiment as viewed in the secondary scanning direction.

FIG. 19 is a diagram illustrating the light focusing state when the asymmetric item of the image forming device array according to an embodiment is removed.

FIG. 22 is a diagram illustrating the optical path of the imaging device array according to the second embodiment as viewed in the secondary scanning direction.

DETAILED DESCRIPTION

Figure 1:
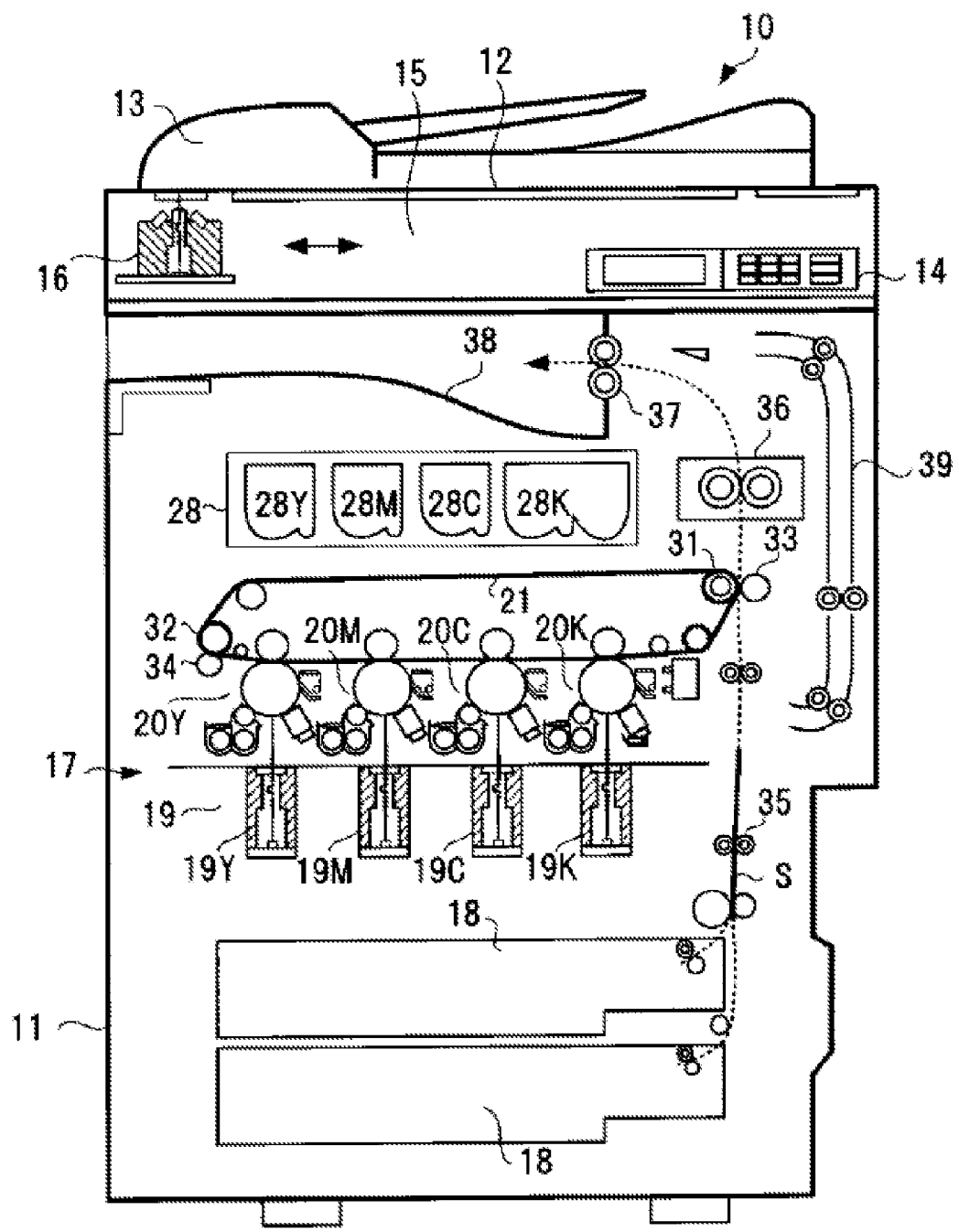
FIG. 1 is a diagram illustrating the configuration of the image forming apparatus according to an embodiment.

Embodiments provide an imaging device array and an image forming apparatus that uses the imaging device array. In the imaging device array, undesired offsets in the desired positions and spacings between the positions of lens and the mirror are suppressed, and the lens array can be formed as a single monolithic molding member. In addition, the surfaces that allow for the control of the shapes include two lens surfaces, three mirror surfaces, or even more surfaces. At least one of the surfaces are formed asymmetric with respect to the axis perpendicular to the primary scanning direction. As a result, the depth of the object field can be increased, and the light quantity can be increased. In addition, by arranging one light-shielding dedicated planar mirror in the array, stray light is significantly ameliorated.

In general, the embodiments of the present invention will be explained with reference to the figures. The same reference numerals will be used to represent the same parts throughout the figures.

The imaging device array in an embodiment of the present invention has plural integrally formed imaging devices, imaging light that is output from the exit surface imaged of an image, including an incidence surface for the incidence of light, plural reflective surfaces including four reflective surfaces for reflecting the light from the incidence surface, and an exit surface that through which light exits the imaging device after having been reflected at the plural reflective surfaces, in which the plural imaging devices are arranged as an array, and a surface for ameliorating or attenuating the propagation of light other than the light reflected from the reflective surfaces to the exit surface is formed adjacent to the periphery of at least one reflective surface among the plural reflective surfaces.

First Embodiment

FIG. 1 is a diagram illustrating the configuration of the image forming apparatus using the imaging device array according to an embodiment. In FIG. 1, an image forming apparatus 10 may be a multifunction peripheral (MFP), a printer, a copier or the like. In the following explanation, an MFP will be taken as an example.

On top of a main body 11 of the MFP 10, there is a document table 12 made of a transparent glass. On the document table 12, an automatic document feeder (ADF) 13 is arranged in a freely opening/closing way. An operation panel 14 is arranged in the upper portion of the main body 11. The operation panel 14 has various types of keys and a touch panel-type display section.

Below the ADF 13 inside of the main body 11, a scanner 15 is positioned for use as a reading apparatus. The scanner 15 reads a document supplied by the ADF 13 or the document set on the document table to generate the image data, and the scanner has a close contact-type image sensor 16 (hereinafter to be referred to as the image sensor). The image sensor 16 extends across the table 12 in the primary scanning direction (the depth direction in FIG. 1).

When the image of the document carried on the document table 12 is read, the image sensor 16 is driven to move along the document table 12 while reading the image of the document line by line. This operation is carried out for the entirety of the document size, so that 1 page of the document is read. On the other hand, when the image of a document supplied by the ADF 13 is read, the image sensor 16 is set at a fixated position (the position shown in the figure) and the document moves therepast.

In addition, in the central position inside of the main body 11, there is a printer section 17. In the lower portion of the main body 11, there are plural cassettes 18 for accommodating various sizes of sheets of paper. The printer section 17 has a photoreceptor drum and an optical scanning apparatus that has the photoreceptor drum exposed. The optical scanning apparatus has a scanning head 19 including an LED array as a light emitting device, and the light rays emitted from the scanning head 19 scan the photoreceptor to generate an image thereon.

The printer section 17 processes the image data read by the scanner 15, or provided by a PC (personal computer) or the like, to form an image on a sheet of paper as the recording media. For example, the printer section 17 may be a color LED printer of the tandem system, including a yellow (Y) image forming section 20Y, a magenta (M) image forming section 20M, a cyan (C) image forming section 20C, and a black (K) image forming section 20K.

The image forming sections 20Y, 20M, 20C, and 20K are arranged below a middle transcribing belt 21 and side by side from the upstream direction to the downstream side. Also, the scanning head 19 has plural scanning heads 19Y, 19M, 19C, and 19K corresponding to the image forming sections 20Y, 20M, 20C, and 20K, respectively.

Figure 2:
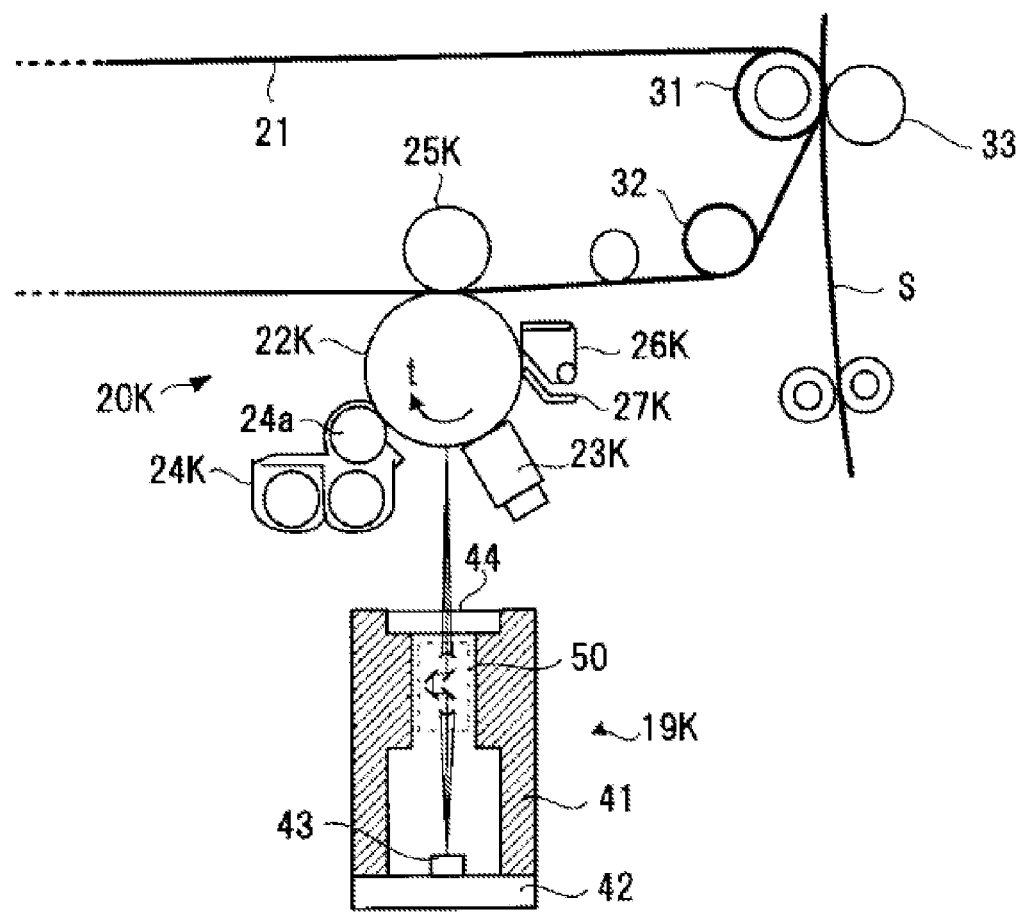
FIG. 2 is an enlarged view illustrating the image forming section according to an embodiment.

FIG. 2 is an enlarged view illustrating the configuration of the image forming section 20K among the image forming sections 20Y, 20M, 20C, and 20K. As the image forming sections 20Y, 20M, 20C, and 20K all have the same configuration, in the following explanation, only image forming section 20K will be explained.

As shown in FIG. 2, the image forming section 20K has a photoreceptor drum 22K as an image carrier. On the periphery of the photoreceptor drum 22K, the following parts are arranged along the rotating direction t: a charger 23K, a developer 24K, a primary transcribing roller 25K, a cleaner 26K, a blade 27K, etc. The light from the scanning head 19K is irradiated on the exposure position of the photoreceptor drum 22K so that an electrostatic latent image is carried on the photoreceptor drum 22K.

The charger 23K of the image forming section 20K evenly charges the surface of the photoreceptor drum 22K. With the developer 24K, a two-ingredient development agent containing a black toner and a carrier is supplied by the developing roller 24a, which has a developing bias applied on the roller, to the photoreceptor drum 22K to form a toner image on the photoreceptor drum 22K. Then, the cleaner 26K uses the blade 27K to remove the residual toner left on the surface of the photoreceptor drum 22K after printing of an image thereon.

As shown in FIG. 1, above the image forming sections 20Y to 20K, a toner cartridge 28 is arranged for supplying toners to the developers 24Y to 24K. The toner cartridge 28 includes the toner cartridges for various colors of yellow (Y), magenta (M), cyan (C) and black (K).

The middle transcribing belt 21 is engaged by a driving roller 31 and a driven roller 32, and the transcribing belt is driven to move in a circulatory way and thus functions as an endless belt. In addition, the middle portion of the transcribing belt 21, on the lowermost portion of its circulating path, is arranged to face and be in contact with the photoreceptor drums 22Y to 22K. As shown in FIG. 2, at the position of the middle transcribing belt 21 facing the photoreceptor drum 22K, a primary transcribing voltage is applied at the interior side of the transcribing belt 21 by the primary transcribing roller 25K, so that the toner image on the photoreceptor drum 22K is transcribed onto the middle transcribing belt 21.

A secondary transcribing roller 33 is arranged in facing opposition the driving roller 31 over which the middle transcribing belt 21 is engaged. When a sheet S to be printed upon passes between the driving roller 31 and the secondary transcribing roller 33, a secondary transcribing voltage is applied by the secondary transcribing roller 33 onto the sheet S. As a result, the toner image on the middle transcribing belt 21 is then secondarily transcribed or transferred onto the sheet S. A belt cleaner 34 (FIG. 1) is positioned near the driven roller 32 of the middle transcribing belt 21 to clean residuals of the image from the transcribing belt 21.

As shown in FIG. 1, conveying roller 35 is positioned in the portion of the main body 11 between the sheet feeding cassette 18 and the secondary transcribing roller 33, for conveying the sheet S fetched from the sheet feeding cassette 18. In addition, a fixer 36 is arranged downstream from the secondary transcribing roller 33. A conveying roller 37 is arranged downstream from the fixer 36. The conveying roller 37 outputs the sheet S to the sheet output section 38. In addition, an inverting conveying path 39 is arranged downstream of the fixer 36. The inverting conveying path 39 flips the sheet S and then guides the sheet in the direction of the secondary transcribing roller 33, and is used in the case of duplex (two sided) printing.

In the following, the configuration of the scanning head 19K in the optical scanning apparatus will be explained with reference to FIG. 2. Here, the scanning head 19K is positioned to face the photoreceptor drum 22K for exposing the surface of the photoreceptor drum 22K. The photoreceptor drum 22K is driven to rotate at a preset rotation velocity, and the drum's surface can accumulate an electric charge. As the light from the scanning head 19K is irradiated on the photoreceptor drum 22K for exposure, an electrostatic latent image is formed on the surface of the photoreceptor drum 22K.

The scanning head 19K has an imaging device array 50. The imaging device array 50 is supported by a holding member 41. On the bottom portion of the holding member 41, there is a supporting body (circuit board) 42. On the supporting body (circuit board) 42, LED devices 43 are arranged as the light source. Here, the LED devices 43 are arranged equidistantly in a almost linear configuration along the primary scanning direction (into the page of FIG. 2). Also, on the supporting body (circuit board) 42, a substrate (not shown in the figure) including a driver IC for controlling the light emission of the LED devices 43 is arranged. The configuration of the imaging device array 50 will be explained in detail later.

The driver IC forms a controller. On the basis of image data read with the scanner 15, or image data generated with a PC or the like, the controller generates a control signal for the scanning head 19K. Corresponding to the control signal, the LED devices emit light with a prescribed light quantity. The light rays emitted from the LED devices 43 are incident on the imaging device array 50. They pass through the imaging device array 50 and are imaged on the photoreceptor drum 22K. In other words, the image is formed on the photoreceptor drum 22K. Also, a cover glass 44 is attached on the top (the light exiting side) of the scanning head 19K.

Figure 3:
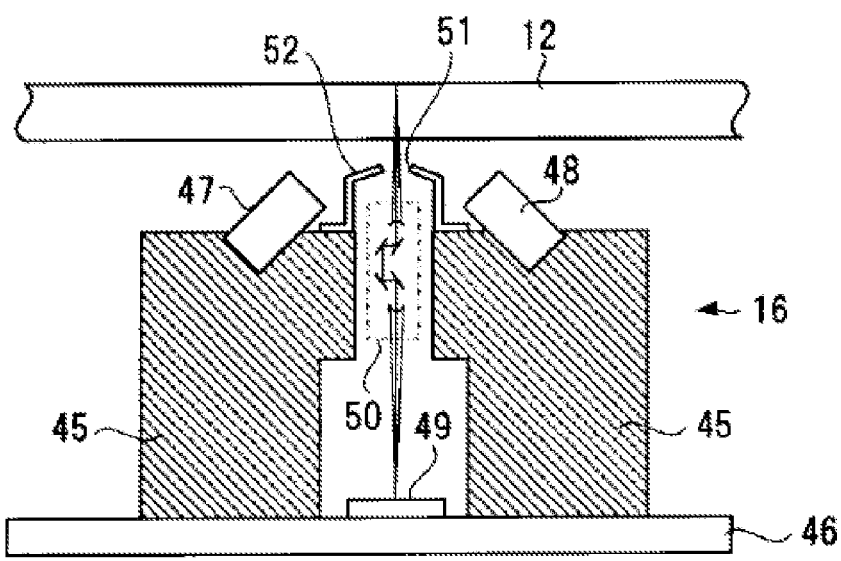
FIG. 3 is an enlarged view illustrating the image reading apparatus according to an embodiment.

FIG. 3 is a diagram illustrating the configuration of the image sensor 16 of the scanner 15 (the reading apparatus). Under control of the operation panel 14, the image sensor 16 reads the image of the document carried on the document table 12 or the document supplied by the ADF (document feeder) 13. The image sensor 16 is a one-dimensional sensor arranged in the primary scanning direction. The image sensor has a case 45.

The case 45 is arranged on a substrate (circuit board) 46. On the upper surface of the document table 12 side of the case 45, two LED line illuminating apparatuses 47 and 48 that irradiate light in the direction of a document on table 12 are arranged to extend in the primary scanning direction (the depth direction as shown in the figure). The LED line illuminating apparatuses 47 and 48 have LEDs and light guiding members. Here, the light source is not limited to the LEDs. One may also adopt fluorescent lamps, xenon lamps, cold cathode tubes, organic ELs, etc.

An imaging device array 50 is supported between the LED line illuminating apparatuses 47 and 48 and in the upper portion of the case 45. On the substrate (circuit board) 46 in the bottom portion of the case 45, a sensor 49 made of CCD or CMOS or the like is positioned. On top of the case 45, a light shielding member 52 provided with a slit 51 is attached.

The light emitted from the LED line illuminating apparatuses 47 and 48 illuminates the image reading position of the document on the document table 12 and is reflected at the image reading position and is incident on the imaging device array 50 after passing through the slit 51. The imaging device array 50 works as an upright one-to-one lens. The light incident on the imaging device array 50 exits from the exit surface of the imaging device array 50 and is imaged on the sensor 49. That is, the light emitted from the LED line illuminating apparatuses 47 and 48 passes through the imaging device array 50. The imaged light is converted by the sensor 49 to an electric signal, which is then sent to the memory section (not shown in the figure) on the substrate (circuit board) 46.

Figure 4:
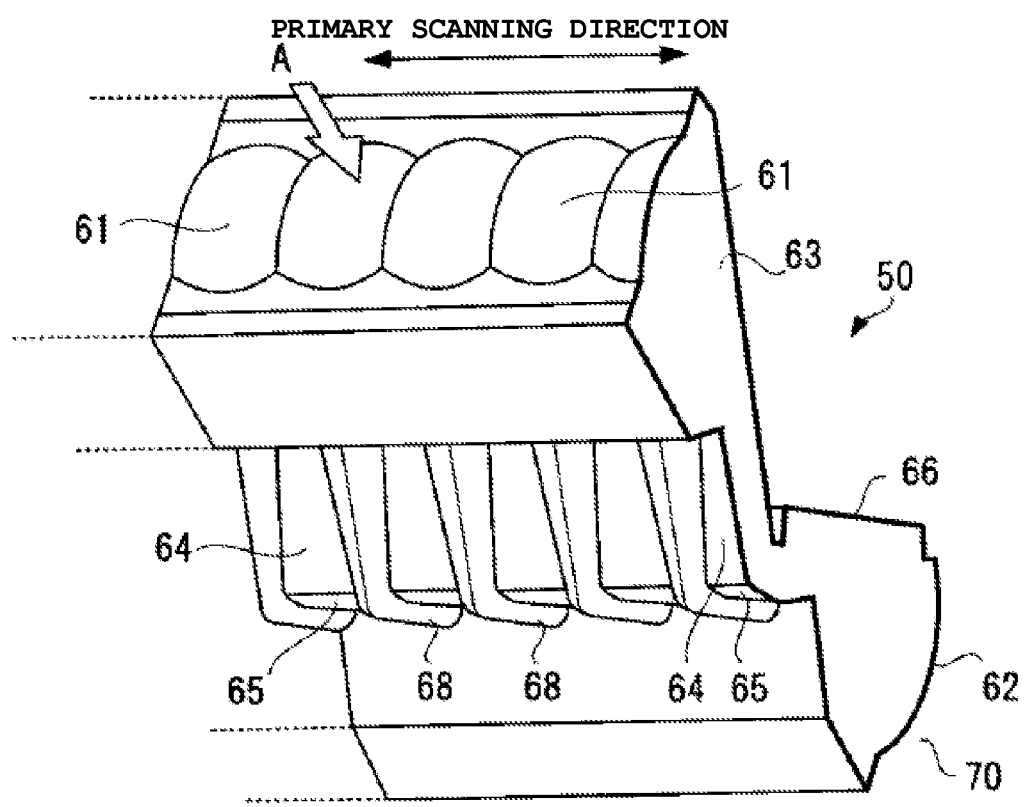
FIG. 4 is a perspective view illustrating an embodiment as viewed from the incidence surface of light of the image forming device array.
Figure 5:
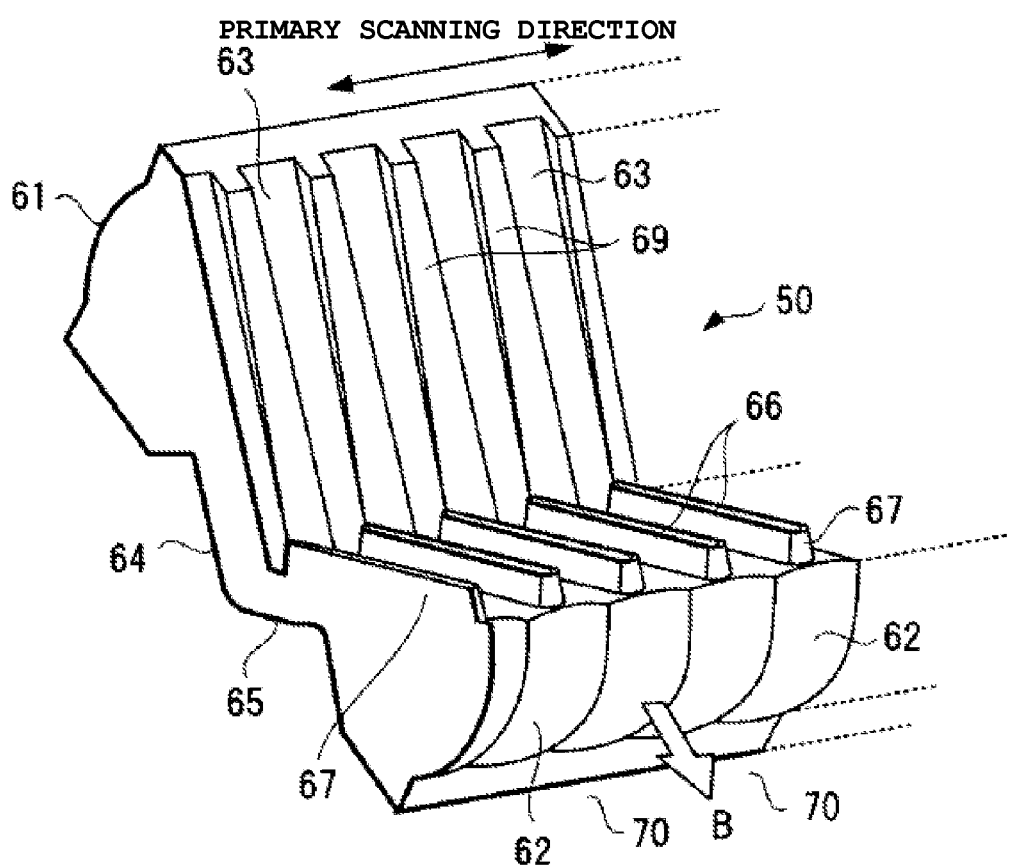
FIG. 5 is a perspective view illustrating an embodiment as viewed from the exit surface of light of the image forming device array.

In the following, the configuration of the imaging device array 50 will be explained in more detail. FIG. 4 and FIG. 5 are diagrams illustrating the basic configuration of the imaging device array 50 according to the first embodiment. FIG. 4 is a perspective view illustrating an embodiment as viewed from the incidence surface of light of the image forming device array 50. FIG. 5 is a perspective view illustrating an embodiment as viewed from the exit surface of light of the image forming device array 50. Here, the incidence direction of light is indicated by arrow A, and the outgoing direction of light is indicated by arrow B.

The imaging device array 50 includes plural imaging devices 70 each having a lens surface 61 as the incidence surface, a lens surface 62 (FIG. 5) as the exit surface, and reflective surfaces 63, 64, 65, and 66 that reflect the light incident from the lens surface 61 in plural rounds (four rounds in the case shown in FIG. 4 and FIG. 5) to the lens surface 62. In the following, the reflective surfaces will be called mirror surfaces.

As shown in FIG. 4 and FIG. 5, the imaging device array 50 has the plural imaging devices 70 extending along the primary scanning direction, with their incidence surfaces and exit surfaces located directly adjacent to each other. Here, the plural imaging devices 70, and the array 50, are monolithically formed, i.e., as a single piece, of a resin or a glass. In the following explanation, the imaging device array 50 will be simply referred to as array 50.

As shown in FIG. 4 and FIG. 5, the lens surface 61 is an asymmetric lens surface (an incidence surface) in the direction perpendicular to the primary scanning direction, and the lens surface 62 is an asymmetric lens surface (the exit surface) in the direction perpendicular to the primary scanning direction. In the following, the lens surface 61 may also be referred to as the incidence lens surface, while the lens surface 62 will be referred to as the exit lens surface.

Also, as shown in FIG. 4 and FIG. 5, the mirror surface 63 is a free formed surface of a mirror asymmetric in the direction perpendicular to the primary scanning direction. As can be seen from the outlook of the array 50, the mirror surface 63 is a tapered recess. The mirror surface 64 (FIG. 4) is also a free formed surface of a mirror asymmetric in the direction perpendicular to the primary scanning direction. The mirror surface is a tapered recess on the surface of the array.

In addition, the mirror surface 65 is also a free formed surface of a mirror asymmetric in the direction perpendicular to the primary scanning direction, and the mirror surface becomes a tapered recess. The mirror surface 66 forms a reflective surface on the top portion of the protrusion or rib 67 protruding outwardly as viewed in the incidence direction of light. Here, the mirror surfaces 63, 64, and 65 are formed in a tapered shape to facilitate pulling of the array 50 from the die used in the molding operation to form the monolithic imaging array 50. Also, the shape of the protrusion or rib 67 is tapered in the height direction, i.e., the sidewall is not perpendicular to the outermost flat surface, but tapers away at an angle of more than ninety degrees.

FIGS. 6A and 6B include schematic diagrams illustrating the configuration of only the lenses and reflective surfaces of the image device array 50. FIG. 6A shows the image device array 50 as a combination of plural imaging devices 70 each including an incidence lens surface 61, the mirror surfaces 63, 64, 65, and 66 and the exit lens surface 62. In FIG. 6A, the incidence lens surface 61, the mirror surfaces 63, 64, 65, and 66 and the exit lens surface 62 are shown separated from each other. However, this is only for facilitating an understanding of the configuration of the imaging devices 70. In the practice, they are molded monolithically from a glass or a resin.

FIG. 6B shows one set of the imaging devices 70 of FIG. 6A including the lens surface 61, the mirror surfaces 63, 64, 65, and 66, and the lens surface 62. The light rays condensed in one set of the imaging devices contribute to imaging. The light rays incident on the incidence lens surface 61 of the one set of the imaging devices 70 are called stray light when they are incident on the other sets of the imaging devices and reach the imaging surface. The stray light is the light rays that degrade the image. As shown in FIG. 6B, the primary scanning direction is indicated by the arrow of "primary," while the secondary scanning direction is indicated by the arrow of "secondary." In the later diagrams, the "primary" arrow indicates the primary scanning direction, while the "secondary" arrow indicates the secondary scanning direction.

The light XC (in FIG. 6B, only the principal ray is shown) incident on the image device array 50 enters the lens surface 61, and the light is condensed in both the primary scanning direction and the secondary scanning direction. Among the light, the light rays contributing to the imaging are incident on the mirror surface 63. The light rays incident on the mirror surface 63 are incident at the incidence angle that satisfies the total reflection condition, so that all of the light rays are reflected by the mirror surface 63; among them, the light rays contributing to the imaging are incident on the mirror surface 64 at the incidence angle that satisfies the total reflection condition. All of the light rays incident on the mirror surface 64 are reflected, and, among them, the light rays contributing to the imaging form an inverted image, and they are then incident on the mirror surface 65 at an incidence angle that satisfies the total reflection condition. In addition, all of the light rays incident on the mirror surface 65 are reflected, and, among them, the light rays contributing to the imaging are incident at the incidence angle that satisfies the total reflection condition on the mirror surface 66.

The mirror surface 66 is formed on the interior surface of the top portion of the protrusion or rib 67. All of the light rays incident on the mirror surface 66 are reflected, and, among them, the light rays contributing to the imaging are guided to the exit lens surface 62, are re-imaged by the lens surface 62, and are formed as a one-to-one upright image on the image plane. The image plane corresponds to the sensor 49 and the photoreceptor drum 22 of FIGS. 1 and 2.

As can be seen from FIG. 4 and FIG. 5, the array 50 is configured and arranged such that the mirror surfaces 63, 64, 65, and 66 have the incident light rays sequentially reflected and guided from the inlet side lens 61 surface to the outlet lens 62 surface. They are arranged side by side in the primary scanning direction with the portions thereof that guide incident stray light rays out of the mirror surfaces, to guide the incident stray light rays to portions of the array so that they are not finally incident on the image plane, or that to light shielding portions of the image device array 50.

That is, the surfaces (the propagating stopping surfaces) that stop the light other than that reflected by the mirror surfaces 63, 64, 65, and 66 from propagating to the lens surface 62 are arranged on the two sides of each of the mirror surfaces 63, 64, 65, and 66. In FIG. 4 and FIG. 5, the portions corresponding to protrusions or ribs 68 on the two sides of the mirror surfaces 64 and 65, the portions corresponding to the protrusions 69 on the two sides of the mirror surface 63, and the end wall of the protrusion 67 that forms the mirror surface 66 as the inner surface of the upper face thereof are the stray light propagation ameliorating surfaces.

FIG. 7A to FIG. 12C illustrate the propagation of the light rays on the various lens surfaces and the mirror surfaces.

In FIG. 7A to FIG. 12C, arrow A indicates the propagating direction of the principal ray XC.

Figure 7A:
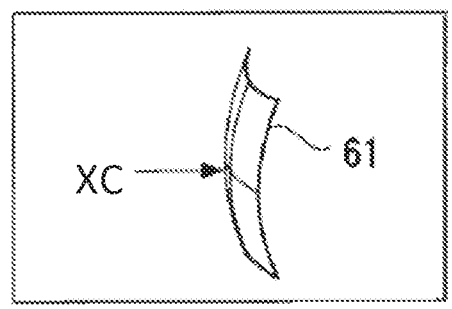
FIGS. 7A to 7C are diagrams illustrating the propagation state of light rays on a lens surface in an embodiment.
Figure 7B:
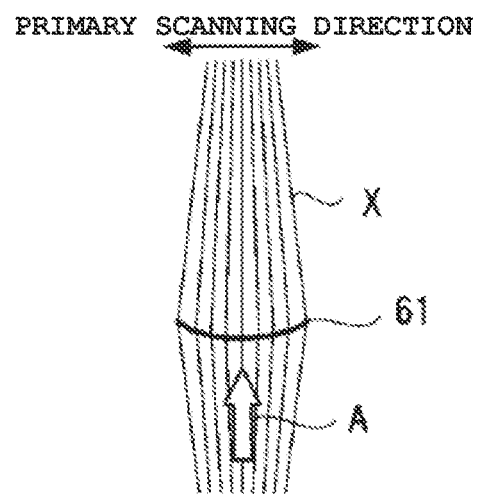
Figure 7C:
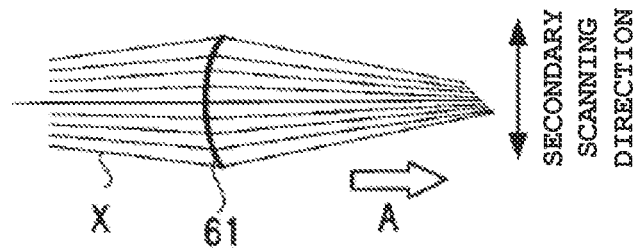

FIG. 7A is a diagram illustrating the incidence direction of the principal ray XC to the lens surface 61, i.e., of the light entering the array. FIG. 7B is a diagram illustrating the lens surface 61 as viewed from the secondary scanning direction. FIG. 7C is a diagram illustrating the lens surface 61 as viewed in the primary scanning direction. The lens surface 61 forms a lens surface (the incident surface) which is asymmetric in the direction perpendicular to the primary scanning direction, and the boundary between the adjacent imaging devices becomes the edge. Consequently, it is possible to minimize the blocked incident light and to increase the optical efficiency.

As shown in FIG. 7B and FIG. 7C, the light ray X becomes a condensing light beam in both the primary scanning direction and the secondary scanning direction. The light rays emitted from the object point at a prescribed height of the object are focused on the middle of one set of the imaging devices 70, and the light rays play the role in increasing the light quantity contributing to the imaging. The shape of the lens surface 61 is asymmetric in the direction perpendicular to the primary scanning direction, so that the various types of aberration generated due to the incidence of a light ray perspective to the mirror surface can be canceled out.

Figure 8A:
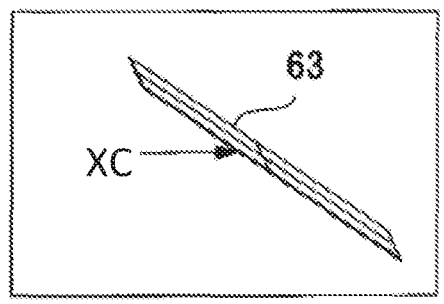
FIGS. 8A to 8D are diagrams illustrating the propagation state of light rays on a mirror surface in an embodiment.
Figure 8B:
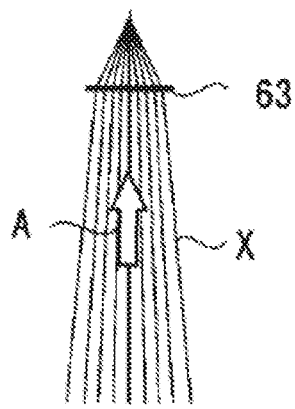
Figure 8C:
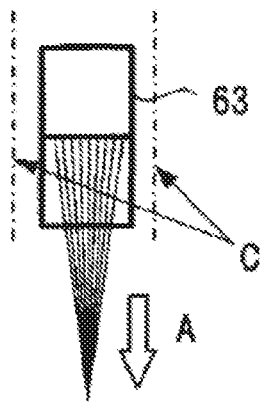
Figure 8D:
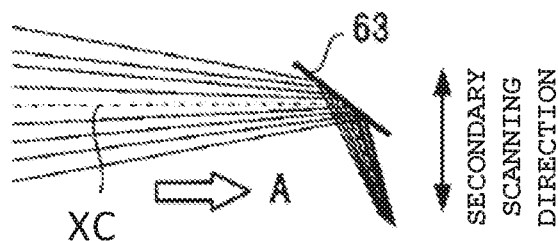

FIG. 8A is a diagram illustrating the incidence direction of the principal ray XC onto the mirror surface 63. FIG. 8B is a diagram illustrating the mirror surface 63 as viewed in the secondary scanning direction. FIG. 8C is a diagram illustrating the mirror surface 63 as viewed in the incidence direction of the light. FIG. 8D is a diagram illustrating the mirror surface 63 as viewed in the primary scanning direction.

The mirror surface 63 is a mirror surface asymmetric in the direction perpendicular to the primary scanning direction, and the mirror surface 63 guides the light rays to the next mirror surface 64. In FIG. 8C, the dotted-dashed line C indicates the boundary surface between the adjacent imaging devices 70. The portion between the mirror surface 63 and the boundary surface C forms the light propagation stop or blanking surface. Light rays incident on this region are finally guided to the light shielding section or to a site out of the image plane of the sensor surface, the photoreceptor drum, etc.

As shown in FIG. 8D, the positions of the mirror surface 63 where the light rays are incident are different as between the upper side and lower side of the principal ray XC. On the upper side, the mirror surface works on the upstream side of the optical path further away from the middle image plane (indicated by the double-dotted-dashed line S in FIG. 17) than the incidence location of principal ray XC, while on the lower side, the mirror surface works on the downstream side of the optical path nearer to the middle image plane S than the incidence location of principal ray XC.

In order to enable a smaller offset between the upper/lower portions of the light rays at the light focusing site, the absolute value of the power for the upper side portion is relatively smaller, while the absolute value of the power for the lower side portion is larger than that of the upper side portion as shown in FIG. 8D. For this purpose, the mirror surface 63 has a shape that is asymmetric in the direction perpendicular to the primary scanning direction.

Figure 9A:
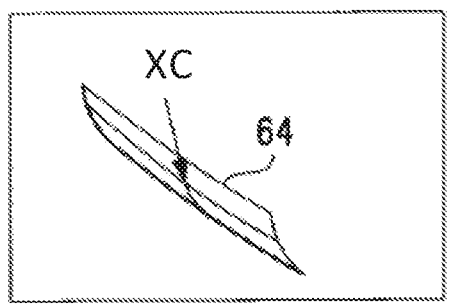
FIGS. 9A to 9D are diagrams illustrating the propagation state of light rays on a mirror surface in an embodiment.
Figure 9B:
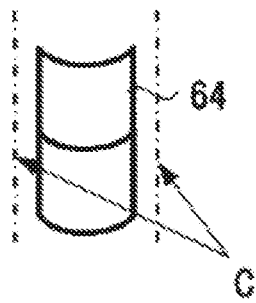
Figure 9C:
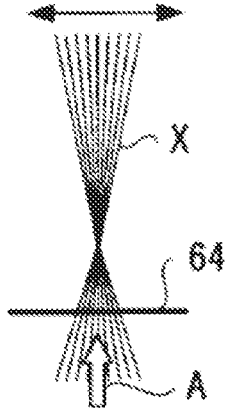
Figure 9D:
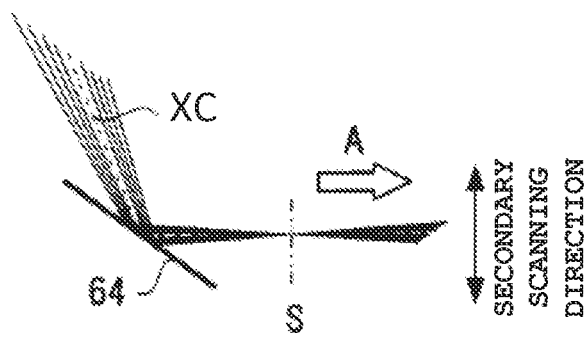

FIG. 9A is a diagram illustrating the incidence direction of the principal ray XC on the mirror surface 64. FIG. 9B is a diagram illustrating the mirror surface 64 as viewed in the light incidence direction. FIG. 9C is a diagram illustrating the mirror surface 64 as viewed from the secondary scanning direction. FIG. 9D is a diagram illustrating the mirror surface 64 as viewed from the primary scanning direction.

Figure 17:
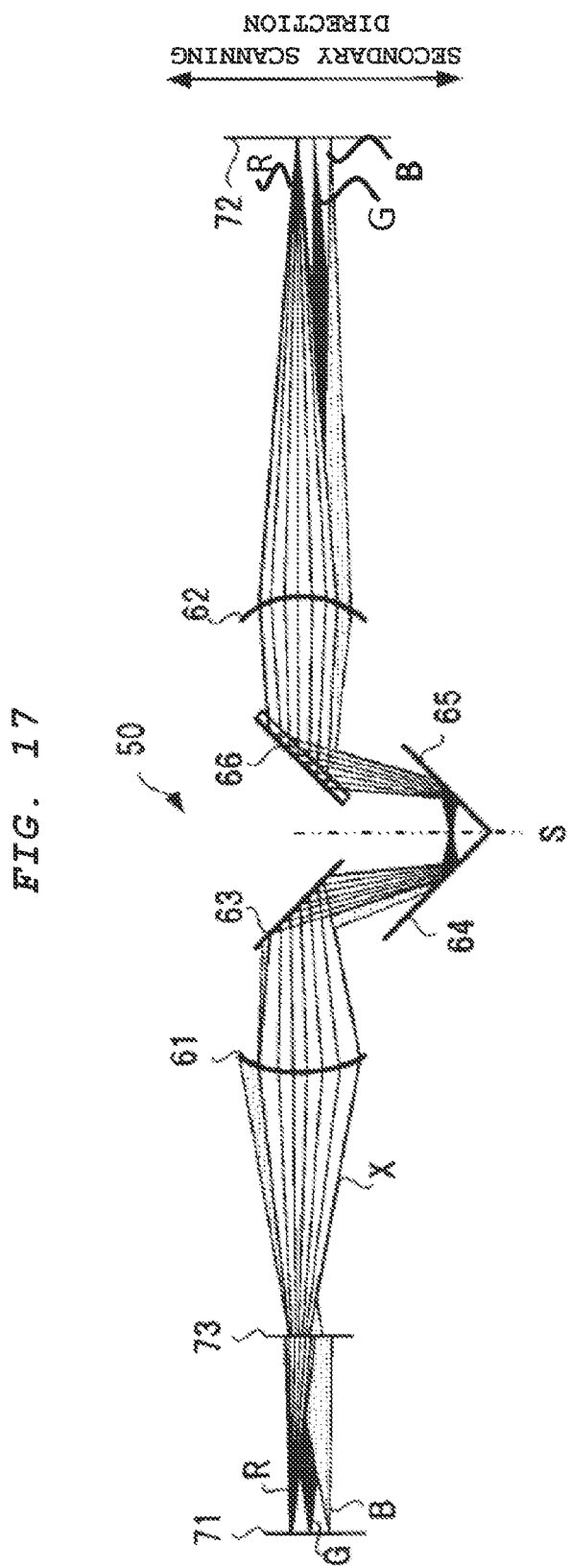
FIG. 17 is a diagram illustrating the path of the light rays of the imaging device array according to an embodiment.

The mirror surface 64 guides the light rays to the next mirror surface 65 (FIG. 17). The dotted-dashed line C in FIG. 9B represents the boundary surface between the adjacent imaging devices 70. The portion between the mirror surface 64 and the boundary surface C becomes the light propagation stop or blanking surface described above. The light rays incident on this region are finally guided to the light shielding section or to a site other than the image plane of the sensor surface, the photoreceptor drum, etc. As shown in FIG. 9D, the sites on the mirror surface 64 where the light rays are incident are different between the upper side and the lower side of the principal ray XC. On the upper side, the mirror surface 64 works on the upstream side of the optical further from the middle image plane S than the incidence location of ray X; on the lower side, the mirror surface 64 works on the downstream side of the optical path nearer to the middle image plane S than the incidence location of ray X.

In order to guarantee a smaller offset between the upper/lower portions of the light rays at the light focusing site, as shown in FIG. 9D, the absolute value of the power for the upper side portion is relatively smaller, while the absolute value of the power for the lower side portion is larger than that of the upper side portion. For this purpose, the mirror surface 64 has a shape that is asymmetric in the direction perpendicular to the primary scanning direction.

Figure 10A:
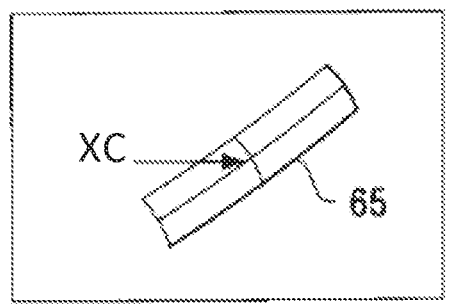
FIGS. 10A to 10D are diagrams illustrating the propagation state of light rays on a mirror surface in an embodiment.
Figure 10B:
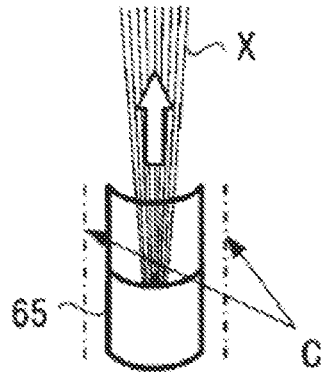
Figure 10C:
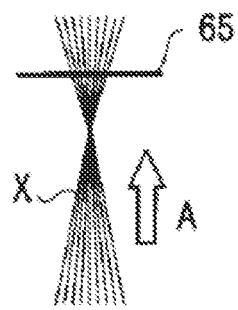
Figure 10D:
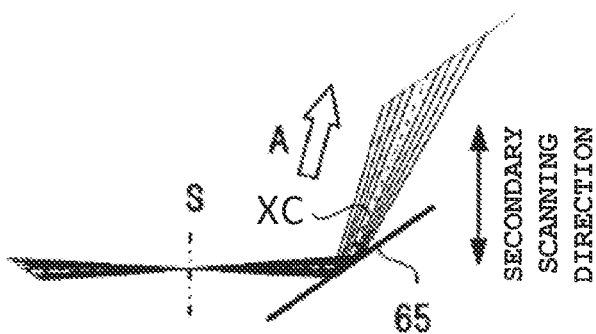

FIG. 10A is a diagram illustrating the incidence direction of the principal ray XC on the mirror surface 65. FIG. 10B is a diagram illustrating the mirror surface 65 as viewed in the light incidence direction. FIG. 10C is a diagram illustrating the mirror surface 65 as viewed from the secondary scanning direction. FIG. 10D is a diagram illustrating the mirror surface 65 as viewed from the primary scanning direction.

The mirror surface 65 guides the light rays to the next mirror surface 66. In FIG. 10B, the dotted-dashed line C represents the boundary surface between the adjacent imaging devices 70. The portion between the mirror surface 65 and the boundary surface C becomes the light propagation stop surface described above. The light rays incident on this region are finally guided to the light shielding section or to a site other than the image plane of the sensor surface, the photoreceptor drum, etc.

In FIG. 10D, the principal ray is taken as principal ray XC (the dotted-dashed line). In this case, the positions of the mirror surface 65 where the light rays are incident are different between the upper side and lower side of the principal ray XC. On the upper side, the mirror surface works 65 on the upstream side of the optical path further from the middle image plane S than the incidence location of ray X, while on the lower side, the mirror surface 65 works on the downstream side of the optical path nearer to the middle image plane S than the incidence location of ray X.

In order to guarantee a smaller offset between the upper/lower portions of the light rays at the light focusing site, the absolute value of the power for the upper side portion of FIG. 10D is relatively smaller, while the absolute value of the power for the lower side portion is larger than that of the upper side portion. Opposite to the mirror surface 64, the distance from the inverted image is shorter on the upstream side of the optical path, and the distance is longer on the downstream side of the optical path. Because the absolute value of the power should be larger for shorter distance from the inverted image, the relationship for the absolute values of the relative power is opposite to that for the mirror surface 64. Consequently, the mirror surface 65 has an asymmetric shape in the direction perpendicular to the primary scanning direction.

Figure 11A:
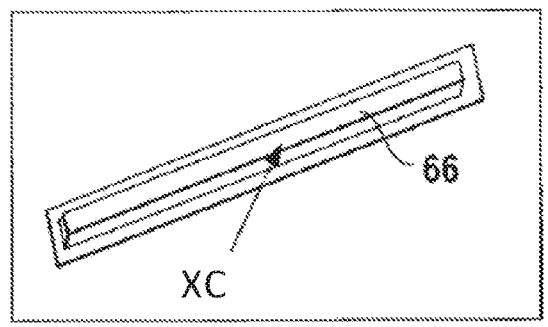
FIGS. 11A to 11D are diagrams illustrating the propagation state of light rays on a mirror surface in an embodiment.
Figure 11B:
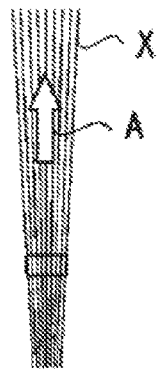
Figure 11C:
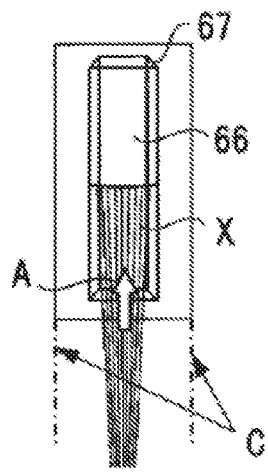
Figure 11D:
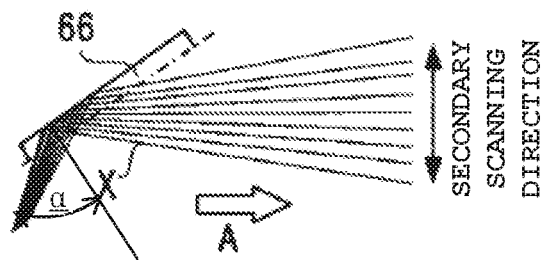

FIG. 11A is a diagram illustrating the incidence direction of the principal ray XC on the mirror surface 66. In this case, the light is incident from the lower side of the mirror surface 66. FIG. 11B is a diagram illustrating the mirror surface 66 as viewed from the secondary scanning direction. FIG. 11C is a diagram illustrating the mirror surface 66 as viewed from the light incidence direction. FIG. 11D is a diagram illustrating the mirror surface 66 as viewed from the primary scanning direction.

The mirror surface 66 guides the light rays to the adjacent exit lens surface 62. Here, the mirror surface 66 is formed on the top of the outwardly projecting protrusion 67. By reflecting at the wall surface of the protrusion 67, the light rays over a prescribed angle with respect to the primary scanning direction are blocked. In FIG. 11C, the dotted-dashed line C indicates the boundary surface between the adjacent imaging devices 70, and the portion between the mirror surface 66 and the boundary surface C becomes the light propagation stop surface. The light rays incident on this region are finally guided to the light shielding section or a site other than the image plane of the sensor surface, the photoreceptor drum, etc.

Figure 12A:
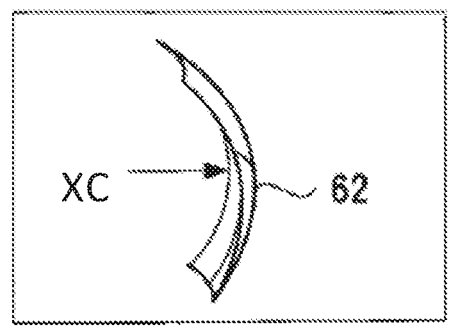
FIGS. 12A to 12C are diagrams illustrating the propagation state of light rays on a lens surface in an embodiment.
Figure 12B:
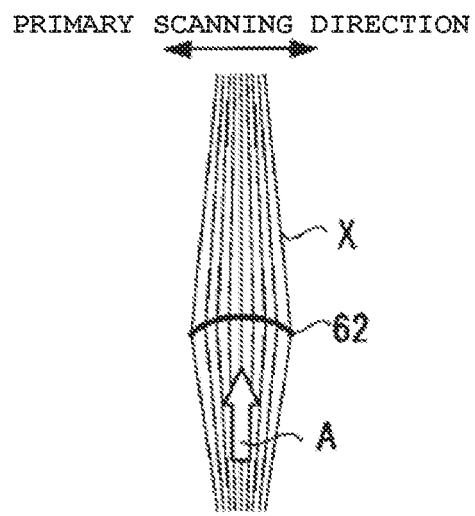
Figure 12C:
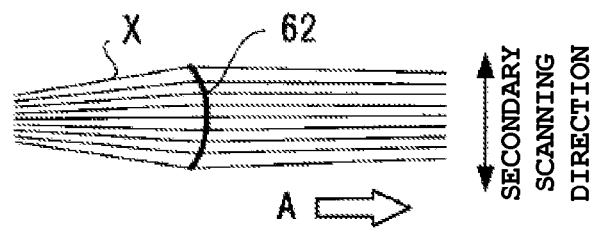

FIG. 12A shows the incidence direction of the principal ray XC on the interior of the lens surface 62. FIG. 12B is a diagram illustrating the lens surface 62 as viewed from the secondary scanning direction. FIG. 12C is a diagram illustrating the lens surface 62 as viewed in the primary scanning direction.

For the lens surface 62, the boundary between the adjacent imaging devices becomes the edge of the lenses. As shown in FIG. 12B and FIG. 12 C, the light rays become condensed light rays in both the primary scanning direction and the secondary scanning direction, so that the light is imaged on the image plane of the sensor 49 or the photoreceptor drum 22 or the like as a direct copy of the image imaged from the sheet S. The shape of the lens surface 62 is asymmetric in the direction perpendicular to the primary scanning direction, so that the various aberrations caused by incidence the light rays obliquely on the mirror surface of the preceding stage can be cancelled out.

Figure 13:
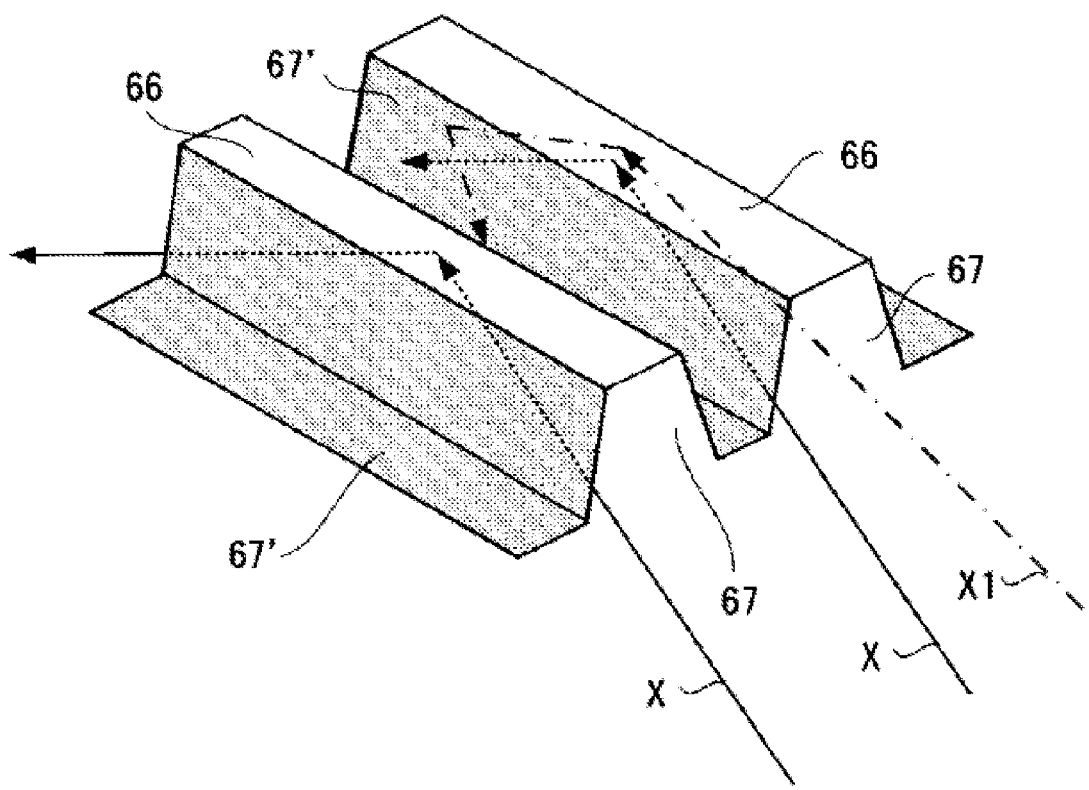
FIG. 13 is an enlarged perspective view illustrating a mirror surface in an embodiment.
Figure 14:
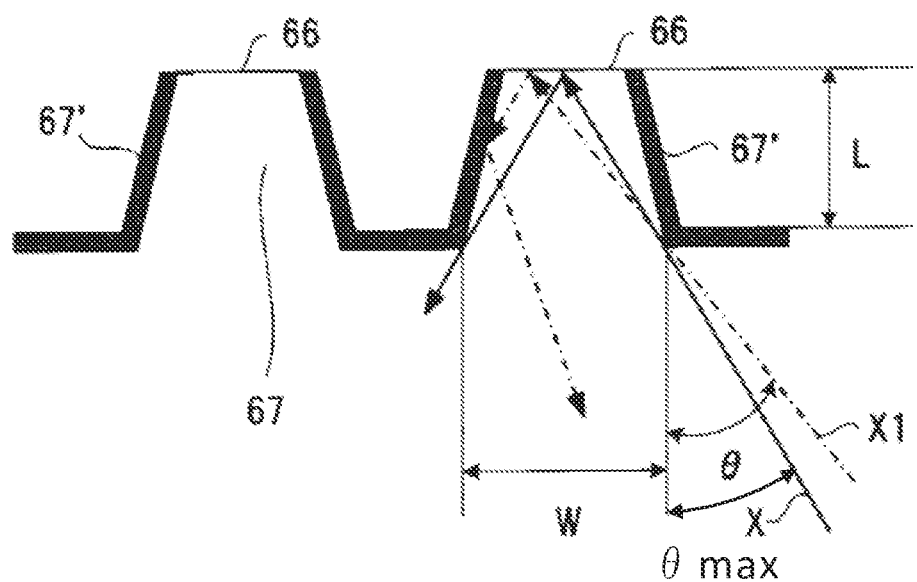
FIG. 14 is a cross-sectional view illustrating a mirror surface in an embodiment.

In the following, the function of the wall of the protrusion 67 on the mirror surface 66 will be explained. FIG. 13 is an enlarged perspective view of the mirror surface 66. FIG. 14 is a cross-sectional view illustrating the mirror surface 66.

The mirror surface 66 is formed as the top interior surface of the protrusion 67. A light ray X is incident on the mirror surface 66, and the light ray is reflected by the mirror surface 66 and exits. On the other hand, the wall surface of the protrusion 67 has the function of culling out the light rays with a large absolute value of the angle θ in the primary scanning direction in the view from the mirror surface 66, i.e., those rays which are stray light. As shown in FIGS. 13 and 14, the light ray X (the solid line) at a prescribed angle of incidence in the primary scanning direction is totally reflected by the mirror surface 66 towards the next optical surface (lens surface 62). On the other hand, the light ray X1 (the dotted-dashed line) with a large absolute value of the incidence angle θ in the primary scanning direction in the view from the mirror surface 66 is reflected from the mirror surface 66 to the wall surface of the protrusion 67 and is reflected by the wall surface of the protrusion 67; and finally, the light ray is guided to the region out of the image plane (i.e., not reflected to the sensor 49 or the photoreceptor drum 22).

As shown in FIG. 14, the maximum value of the incidence angle θ in the primary scanning direction in the view from the mirror surface 66, θmax, is determined by the following formula, where W represents the width of the inlet connected to the mirror surface 66 in the primary scanning direction and L represents the distance between the inlet and the mirror surface 66.

$$\tan \theta \max = W/2/L$$

The ray of the absolute value of the incidence angle θ which is larger than θmax is guided to the region out of the image plane.

Consequently, by determining the shape of the wall surface of the protrusion 67 on the basis of the above-listed formula, it is possible to prevent the stray light from imaging on the image plane. Also, a light shielding layer may be formed on the wall surface of the protrusion 67 and the adjacent wall surfaces. For example, the light absorbing layer may be formed by coating a light absorbing ink 67'. By coating the light absorbing ink 67', it is possible to absorb the light that reaches the wall surface of the protrusion 67. In this case, the ray of the absolute value of the incidence angle θ which is larger than θmax is absorbed by the light absorbing ink 67'.

FIGS. 15A to 15C are diagrams illustrating the state of light reflected at surface 66 with and without the use of the protrusion. FIG. 15A shows the state of the light rays reflected from the mirror surface 66 when there is no protrusion 67. In FIG. 15A, the light from the middle image plane S is reflected by the mirror surface 66 to become the imaging light (the light used in imaging). In the imaging light, the stray light can be culled or eliminated for a certain range or span (the range indicated by the width of the arrow D). However, the stray light cannot be cut off for the entire wide angular reflection range of the device.

FIG. 15B is an enlarged view illustrating the stray light portion E of FIG. 15A which is outside of the range indicated by arrow D. For the light ray X2 generated out of the range indicated by the arrow D, the light incident on the mirror surface 66 or the light exiting from the mirror surface 66 has the absolute value θ' of the angle in the primary scanning direction in the view from the perpendicular direction of mirror surface 66, which is an angle between X2 at the mirror surface 66 and a system optical axis X3, as larger than that of the light rays used as the imaging light.

That is, as the light rays with an absolute value of the angle in the primary scanning direction larger than the absolute value of the angle in the primary scanning direction of the light adopted as the imaging light are shielded at least at one site of the optical path, all of the stray light can be eliminated in the entire region.

FIG. 15C is a diagram illustrating the pattern of the light rays exiting from the mirror surface 66 when the protrusion 67 is used. As can be seen from FIG. 15C, by arranging the protrusion 67, a confirmation is made that the stray light has been eliminated, as the rays X2 are eliminated.

Figure 16:
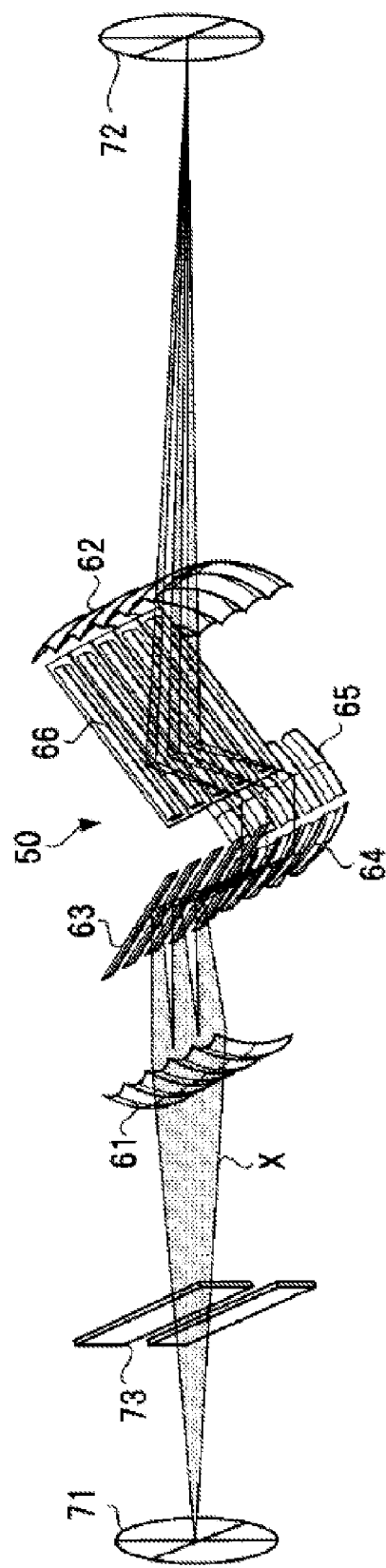
FIG. 16 is a perspective view illustrating the path of the light rays of the imaging device array according to an embodiment.

FIG. 16 is a diagram illustrating the path of the light ray X of the image device array 50 arranged between an object plane 71 and an image plane 72. Between the object plane 71 and the image device array 50, a slit 73 for preventing the stray light is arranged. The light from the object plane 71 (the LED devices 43 or the document carrying plane of the document table 12) passes through the slit 73 and is throttled; the light is then incident on the lens surface 61 of the array 50, is reflected by the mirror surfaces 63, 64, 65, and 66, exits from the lens surface 62 and is imaged on the image plane 72 (the photoreceptor drum 22 or the sensor 49).

FIG. 17 is a diagram illustrating of the image device array 50 as viewed in the primary scanning direction. FIG. 18 is a diagram illustrating the image device array 50 as viewed in the secondary scanning direction.

As can be seen from FIG. 17, with respect to the primary scanning direction, the light beams (such as R, G, and B) from the object plane 71 pass through the slit 73 and are incident on the lens surface 61, so that an inverted image is formed near the middle side (S) of the image device array 50, and the inverted image is inverted again to form a upright image on the image plane 72. By using the image device array 50 where the positions of the mirrors and lenses are fixed with respect to one another by being formed as a monolithic single piece, it is possible to increase the depth of the object field and to increase the light quantity. Also, as can be seen from FIG. 18, with respect to the secondary scanning direction, the light passing through the plural sets of the imaging devices 70 is focused at the point on the image plane 72, corresponding to the point on the object plane 71. The image of the object O1 is I1, and the image of the object O2 is I2.

As explained above, the surfaces other than the mirror surface 66, that is, the lens surfaces 61 and 62 and the mirror surfaces 63, 64, and 65 each have an asymmetric shape in the direction perpendicular to the primary scanning direction, so that it is possible to correct for the curving of the image plane and the coma aberration.

FIG. 19 is a diagram illustrating the light focusing state when the asymmetry of the image device array 50 including the lens surfaces 61 and 62 and the mirror surfaces 63, 64, 65, and 66 are all eliminated (that is, when they all have a shape symmetric in the direction perpendicular to the primary scanning direction) as viewed from the primary scanning direction. When the asymmetrical component is removed, the defocusing quantity varies for the light beams (such as R, G, and B) corresponding to the position of the secondary scanning direction. That is, the focused positions of Fr, Rg, and Fb, each representing a specific coplanar location on the object, are focused at a different depth from each other.

Consequently, with the asymmetry as used herein, focusing on the image plane (photoreceptive drum) can be carried out in a narrow depth of field range. When the focusing precision is not required to be so high, the embodiment shown in FIG. 19 may also be adopted.

In the first embodiment, the mirror surface 66 having a protrusion 67 is a flat plane. However, the mirror surface 66 may also be a surface with a certain power (a surface with a curvature).

Also, the mirror surface 66 is arranged immediately before the exit lens surface 62; among the mirror surfaces 63, 64, 65, and 66, the mirror surface 66 with the highest light shielding performance is arranged on the most downstream side, so that among the stray light generated on the upstream side, the light with an angle over the absolute value θmax is entirely shielded. In addition, as shown in FIG. 14, a light absorbing layer (a light absorbing ink 67') is applied on the wall surface of the protrusion 67 so that the effect of the ameliorating the quantity of stray light reaching the photoreceptive drum is enhanced.

Second Embodiment

Figure 20A:
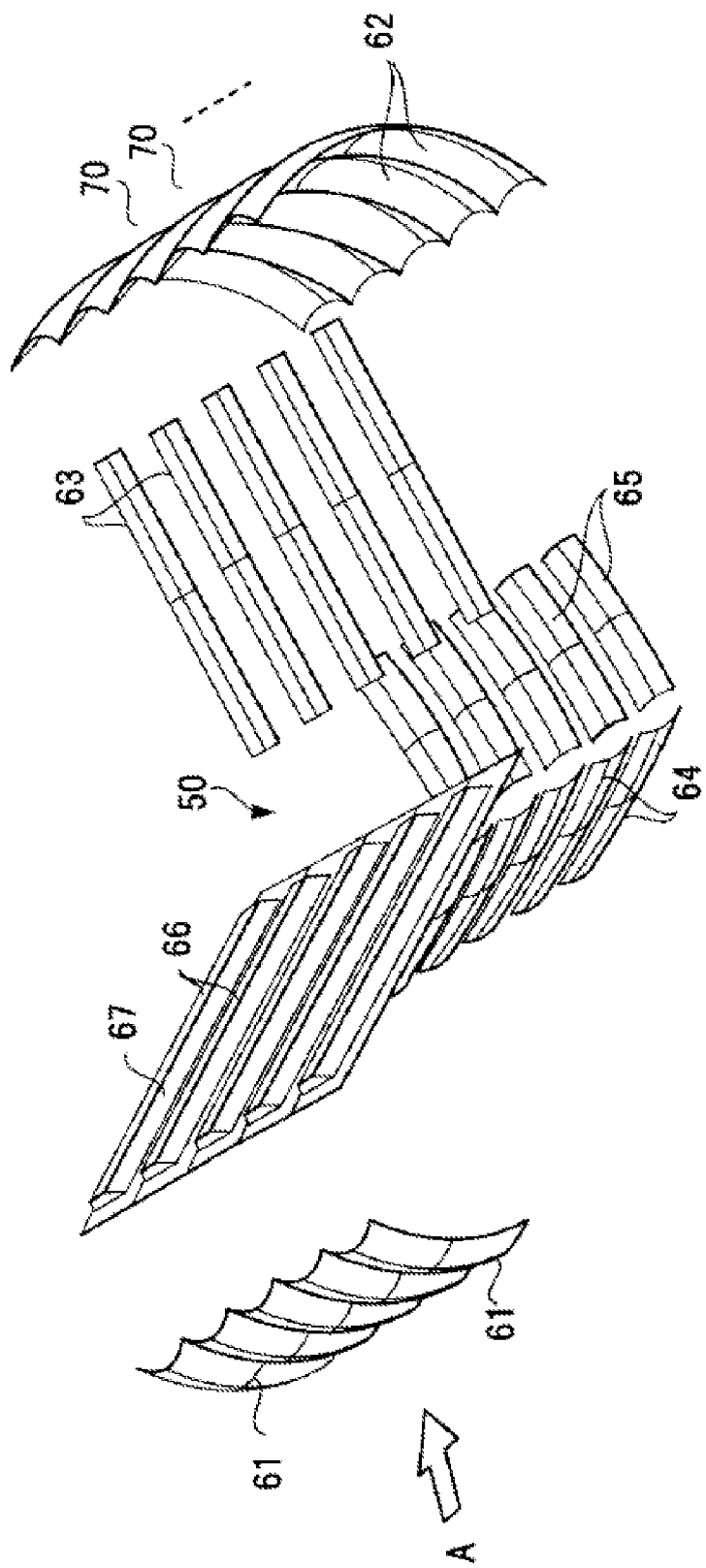
FIGS. 20A and 20B are diagrams illustrating the configuration of the imaging device array according to the second embodiment.
Figure 20B:
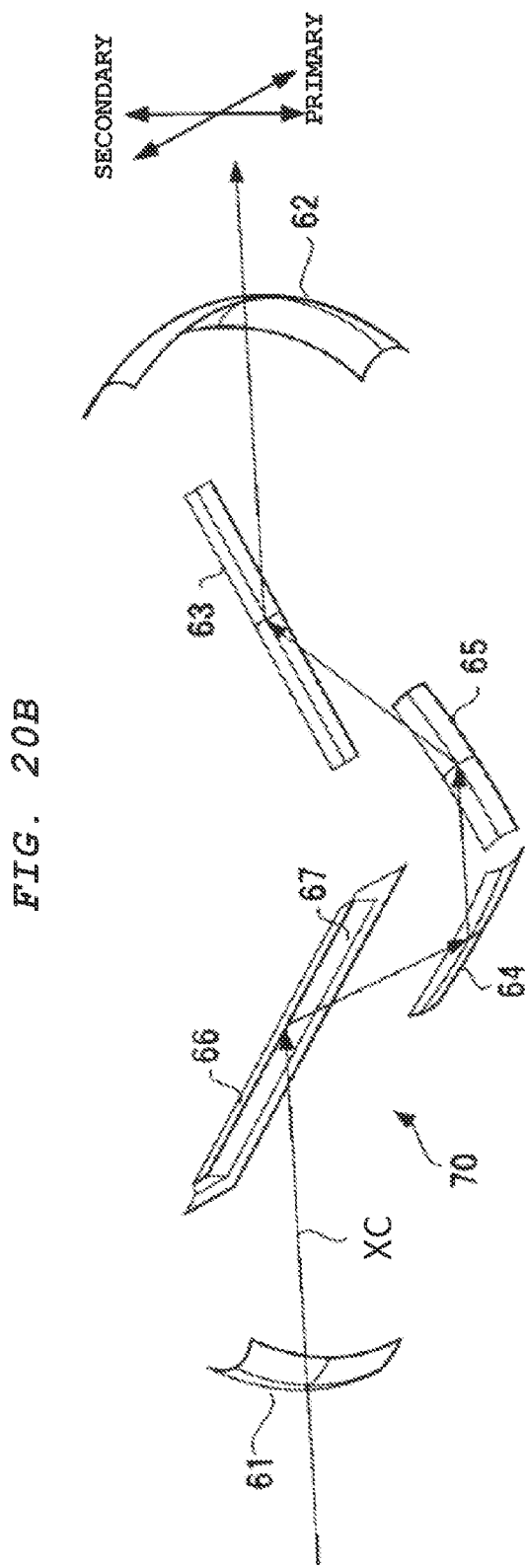

FIGS. 20A and 20B are diagrams illustrating the configuration of the image device array 50 corresponding to the second embodiment. As shown in FIG. 20A, according to the second embodiment, the mirror surface 66 having the protrusion 67 is the mirror surface positioned directly adjacent to the incidence lens surface 61 such that light entering the array 50 is first reflected at the protrusion 67 and thus stray light and light to become the stray light in the downstream mirrors and lens is immediately removed or culled from the light rays passing through the array 50, and the mirror surface 63 is located adjacent to and facing the exit lens 62 surface such that light therefrom directly leaves the array 50 through the exit lens 62 surface. The remaining features are the same as those in the first embodiment.

That is, as shown in FIG. 20B, the light X incident on the imaging devices 70 enters the lens surface 61 (the incidence surface), and the light is condensed in both the primary scanning direction and the secondary scanning direction. Among the light rays entering the array 50, the light rays contributing to the imaging are incident on the mirror surface 66. The mirror surface 66 is formed on the top portion of the protrusion 67 protruding outwardly. All of the light rays incident on the mirror surface 66 are reflected, and, among the light rays, the light rays contributing to the image are incident on the mirror surface 64 and those representing stray light are reflected away from mirror surface 64.

The light rays incident on the mirror surface 64 are reflected; among these light rays, the light ray contributing to the imaging form an inverted image, and the light is then incident on the mirror surface 65. Then, the light rays incident on the mirror surface 65 are reflected, and, among these light rays, the light rays contributing to the imaging are incident on the mirror surface 63. Among the light rays incident on the mirror surface 63, the light rays contributing to the imaging are guided to the lens surface 62 (the exit surface), and the light rays are re-imaged by the lens surface 62 to form a one-to-one upright image on the image plane spaced therefrom.

The angle of the light rays in the primary scanning direction for the light rays that passed through the lens surface 61 only increases monotonically as the distance in the primary scanning direction from the object plane is increased. Consequently, by arranging the mirror surface 66 having a protrusion 67 right behind the lens surface 61, it is possible to cull the undesirable light rays immediately after the incidence lens surface 61. Here, as the light rays are culled on the upstream side, the shapes of the light culling portions (the light propagation stop or blanking surfaces) between the various mirrors on the downstream side can be simplified, and the shape of the dies for molding the image device array 50 can be simplified.

However, culling all of the stray light with a large angle is difficult when the stray light is generated downstream of the mirror surface 66, so that the edges of the mirror surfaces 64, 65, and 63 should be formed to have a sharp shape which has no rough face causing the diffused stray light.

Figure 21:
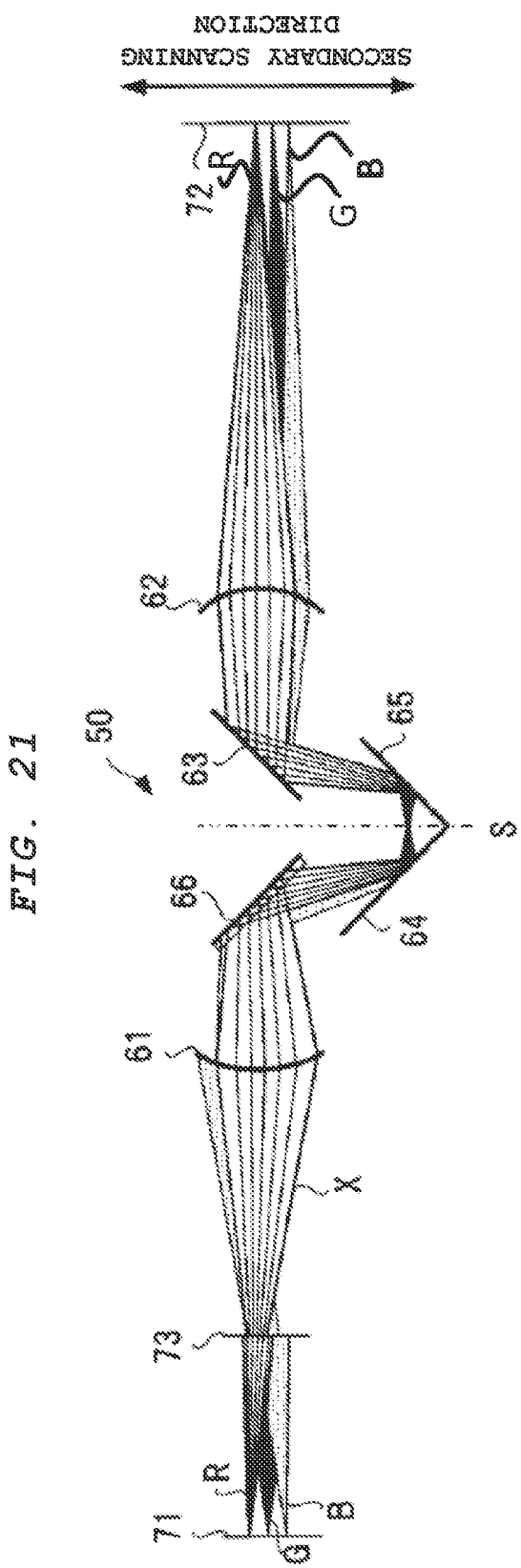
FIG. 21 is a diagram illustrating the optical path of the imaging device array according to the second embodiment as viewed in the primary scanning direction.

FIG. 21 is a diagram illustrating the optical path of the array 50 shown in FIGS. 20A and 20B as viewed in the primary scanning direction. FIG. 22 is a diagram illustrating the optical path of the array 50 as viewed in the secondary scanning direction. As can be seen from FIG. 21, with respect to the primary scanning direction, the light beams (such as R, G, and B) emanating from a single location from the object plane 71 pass through the slit 73 and are incident on the lens surface 61 so that an inverted image is formed near the middle (S) of the image device array 50. By inverting the inverted image again, an upright image is formed on the image plane 72 and each image from the location on the object plane is focused at the image plane (electrostatic drum 21). Also, as can be seen from FIG. 22, with respect to the primary scanning direction, light passing through the plural sets of the imaging devices 70 can focus at the point on the image plane 72, corresponding to the point on the object plane 71. The image of the object O1 is I1, and the image of the object O2 is I2.

Figure 23A:
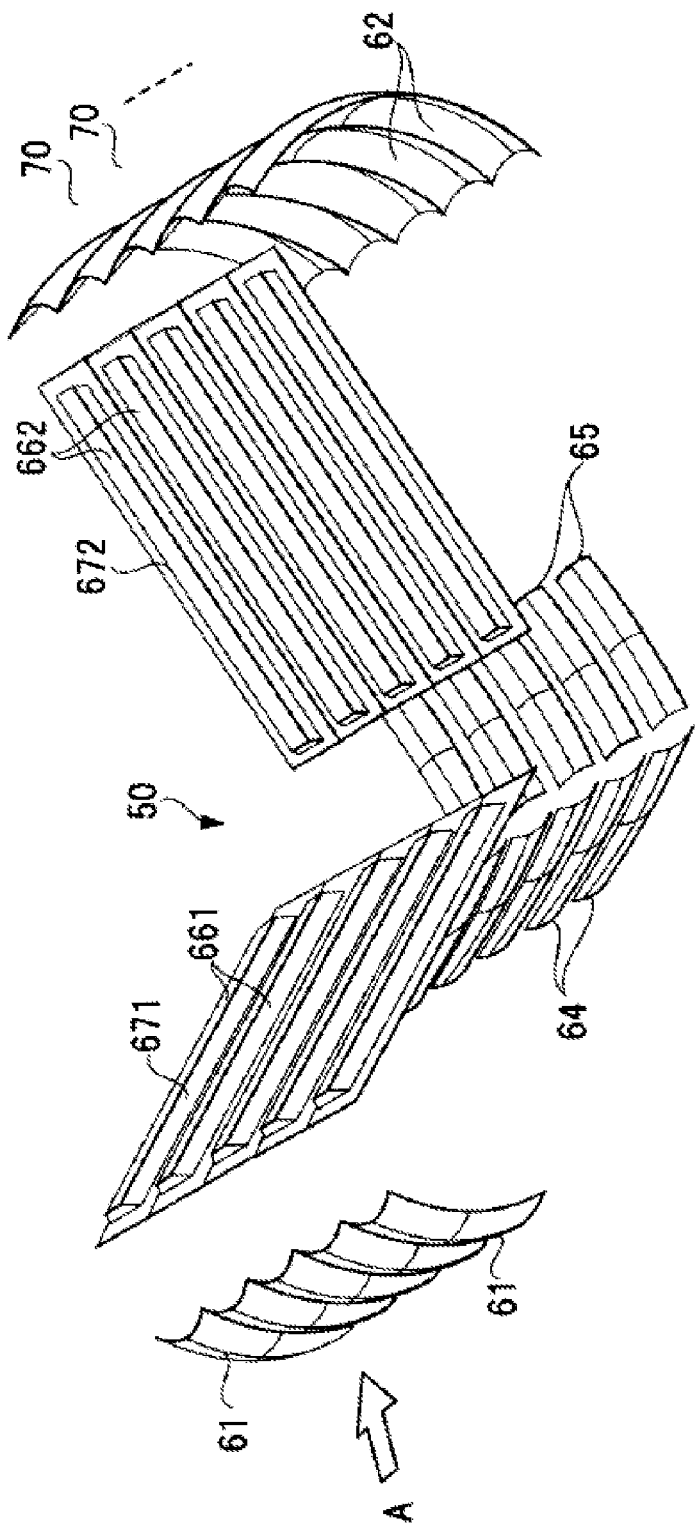
FIGS. 23A and 23B are diagrams illustrating the configuration of a modified example of the imaging device array according to the second embodiment.
Figure 23B:
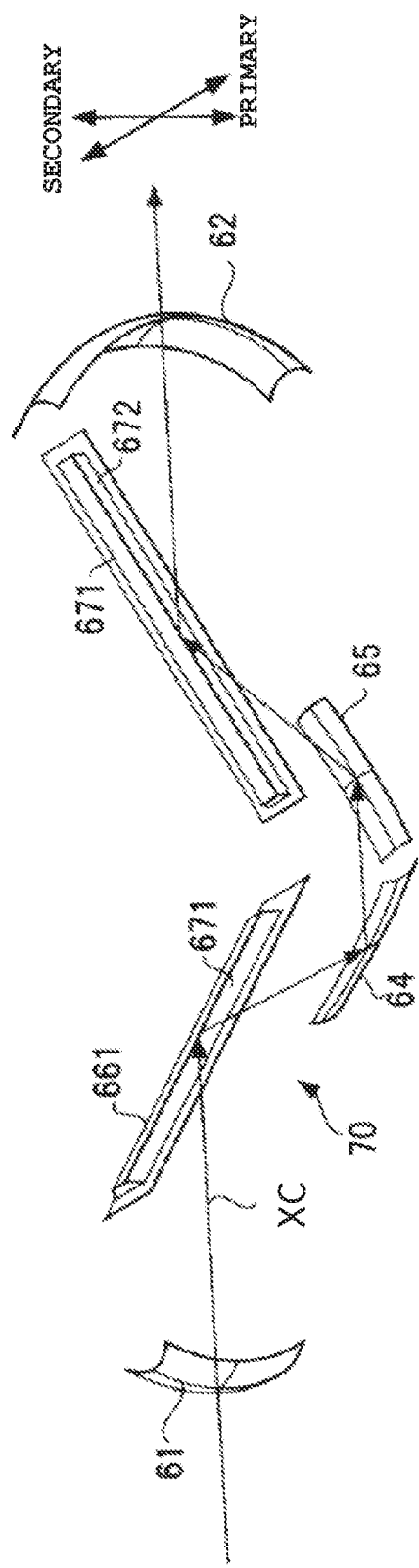

FIGS. 23A and 23B include diagrams illustrating the configuration of the imaging device array in a modified example of the second embodiment. Thus the stray light amelioration or culling effect of the mirrors at the base of the slot, (i.e., at the inner face of the outwardly extended protrusion) is present at the light receiving and light exiting sides of the array. In the example shown in FIGS. 23A and 23B, a mirror surface 661 having a protrusion 671 is arranged next to the lens surface 61 on the incidence side, and a mirror surface 662 having a protrusion 672 is arranged in front of the lens surface 62 on the exit side.

The undesired (stray) light rays can be culled by the mirror surface 661 immediately after passing through the lens surface 61. Also, stray light generated within the array can be culled before the exit lens surface 62. Consequently, it is possible to prevent the stray light from becoming incident on the incidence surface.

Third Embodiment

In the embodiments described above, an assumption is made that the light from the object point has a wide divergent angle. However, if the light emitted from the object point has a high directionality, instead of the light shielding wall surface formed on the protrusion 67 protruding outwardly, other surfaces or other light propagation stop surfaces may be formed. Assuming that the incident beams maximum angle is less than θmax, which is same as embodiment 1 and 2.

Figure 24A:
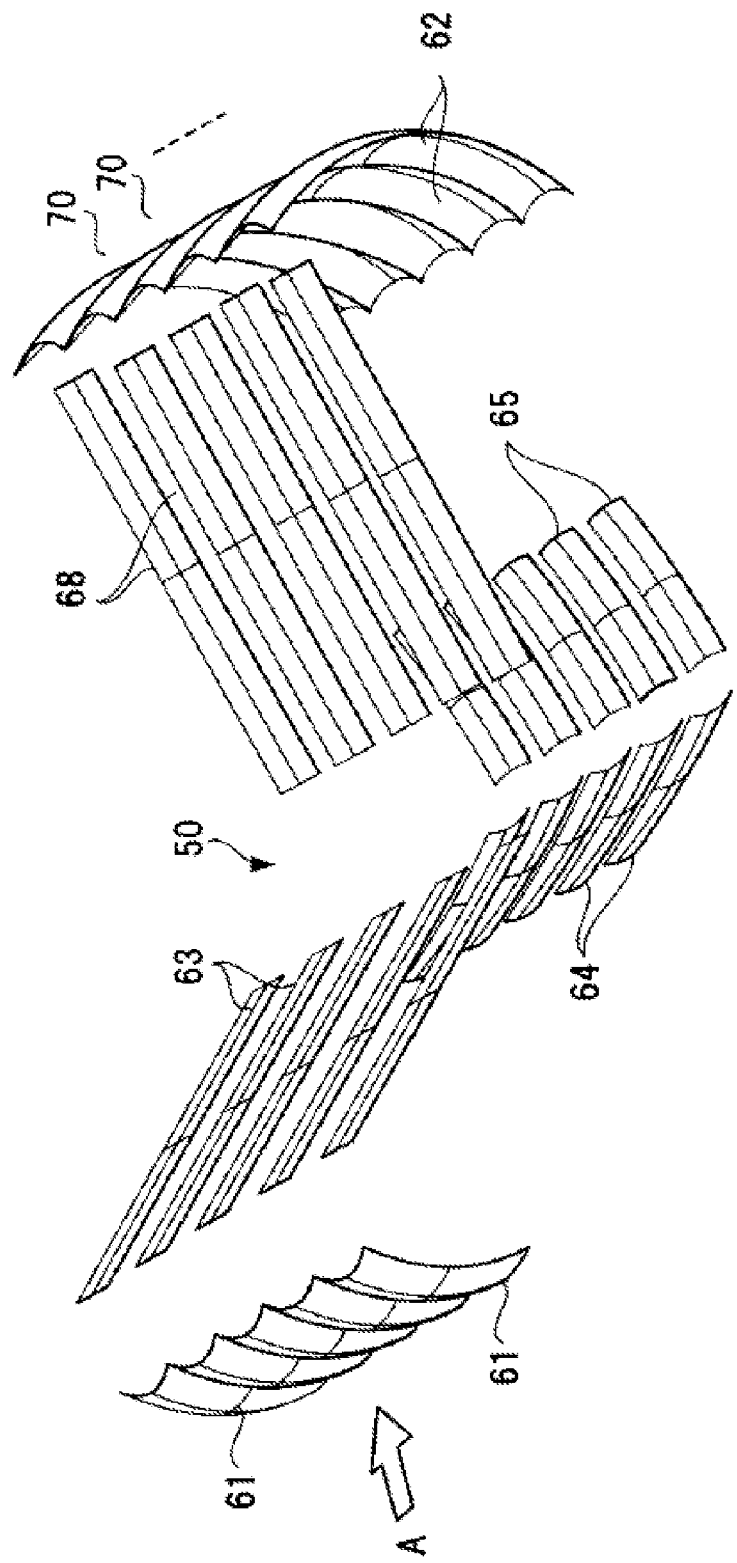
FIGS. 24A and 24B are diagrams illustrating the configuration of the image forming device array according to the third embodiment.
Figure 24B:
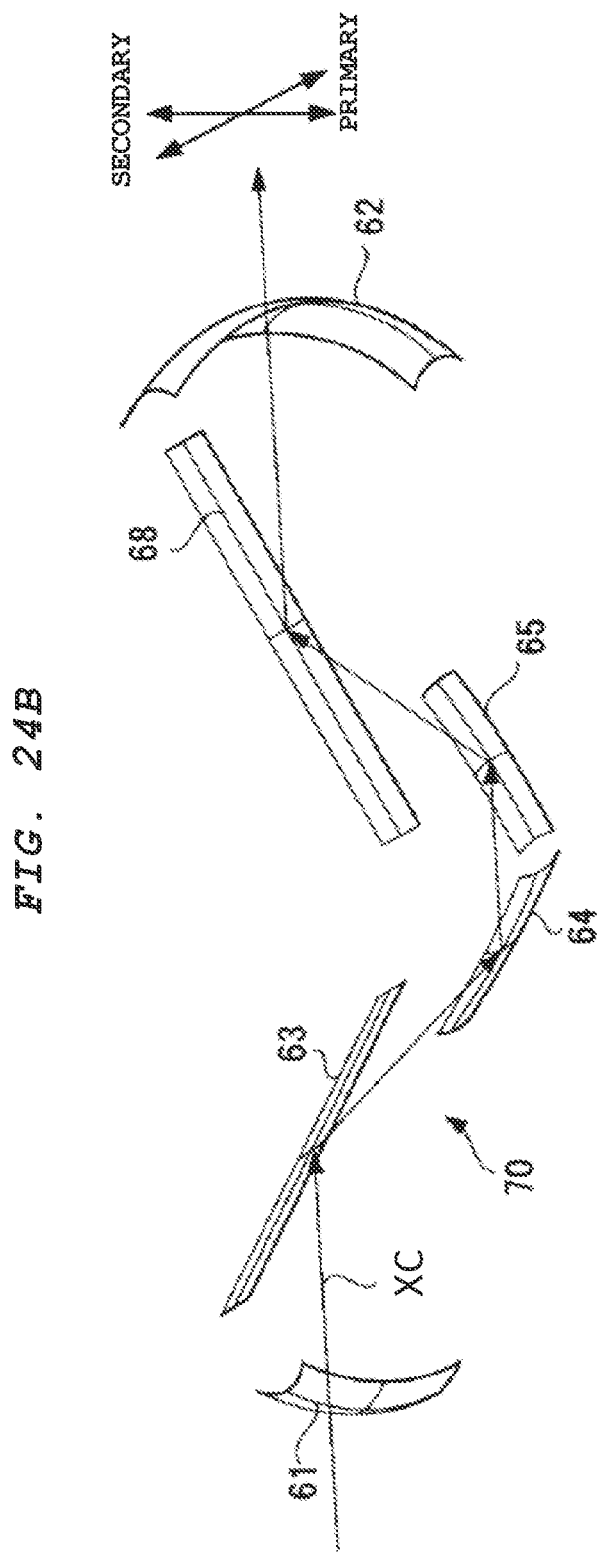

FIGS. 24A and 24B are diagrams illustrating the image device array 50 according to the third embodiment. For the image device array 50 shown in FIG. 24A, instead of the mirror surface 66 formed as a reflective surface on the top portion of the protrusion 67 protruding outwardly from the light incidence direction shown in FIGS. 6A and 6B, a combination of the imaging devices 70 using mirror surfaces 68 is adopted. FIG. 24B is a diagram illustrating one such imaging device 70.

Just as the other mirror surfaces 63, 64, and 65 between the various mirror surfaces 68, a light propagation stop surface is formed. The light rays incident on this region are finally guided to the light shielding section or the site other than the image surface of the sensor surface, the photoreceptor drum, etc. Also, in order to reduce the up/down offset in the light rays of the focusing site, the mirror surfaces 68 are formed to have an asymmetric shape in the direction perpendicular to the primary scanning direction.

According to the first through third embodiments, depending on the required specifications, some of the mirror surfaces are formed in a shape symmetric in the direction perpendicular to the primary scanning direction or as a flat plane. One may also adopt a scheme in which the light propagation stop or blanking surface is not arranged between some of the mirror surfaces, and these mirror surfaces are in light communication with each other.

According to the imaging device arrays in the embodiments described above, a single molding can form the imaging device array. Consequently, it is possible to suppress the relative positional offset of the lenses and mirrors. Consequently, by adopting the image forming apparatus, forming images with a high quality is possible. For the imaging device arrays in the embodiments, the cut-in quantity for light shielding is small, and the ratio of the height to the width of the array (the aspect ratio) is small, so that the preparation of the molding and dies become simpler, and the molding cycle time can be shortened.

In addition, the surfaces that have their shapes controllable include two lens surfaces and four mirror surfaces, and the mirror surfaces are formed asymmetric with respect to the direction perpendicular to the primary scanning direction, so that it is possible to increase the depth of the object field and to increase the light quantity for the imaging device array provided by the present invention.

In the above, the embodiments of the present invention have been explained with reference to an MFP as the image forming apparatus. However, the image forming apparatus is not limited to an MFP. The image forming apparatus for the present embodiment of the invention may also include the image reading apparatus of the stand-alone scanners and the light scanning apparatus of the stand-alone electrophotographic printers.

While certain embodiments have been described, these embodiments have been presented by way of example only, and they are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging device array having a plurality of imaging devices arrayed in a row in a primary scanning direction and being molded monolithically of one of a resin and a glass therewith, for forming a one-to-one upright image resulting from an image at an object surface on an imaging surface, each imaging device of the plurality of imaging devices comprising:
   an incidence surface through which light rays are condensed in both the primary scanning direction and a secondary scanning direction perpendicular to the primary scanning direction;
   a plurality of reflective surfaces including first, second, third, and fourth reflective surfaces for reflecting the light rays received at the incidence surface, wherein the incidence surface, and the first and second reflective surfaces, focus the light rays on a middle of the imaging device, and the second and third reflective surfaces each has a shape that is asymmetric in a direction perpendicular to the primary scanning direction; and
   an exit surface that condenses the light rays in the primary and secondary scanning directions.

2. The imaging device array according to claim 1, wherein the device further includes at least one protrusion which protrudes from a surface of the array, wherein a reflective surface of the plurality of reflective surfaces is disposed on each of the at least one protrusion.

3. The imaging device array according to claim 2, wherein at least one of the first and fourth reflective surfaces is formed on the at least one protrusion.

4. The imaging device array of claim 2, wherein each protrusion of the at least one protrusion has the reflective surface disposed on an innermost side of an outermost surface thereof, two sidewalls interposing the reflective surface, and an inlet which is arranged opposite the reflective surface in the protrusion and spans over the reflective surface.

5. The imaging device of claim 4, wherein the inlet has a width W in the primary scanning direction, and the sidewalls of the protrusion have a height L, and the maximum angle of light from perpendicular to the reflective surface in the primary scanning direction in the view from a reflective surface direction that may enter and leave the inlet is $\theta max$, where $\tan \theta max = W/2/L$.

6. The imaging device of claim 4, wherein the sidewalls are coated with a light absorbing material.

7. The imaging device array according to claim 1, wherein at least one of the plurality of reflective surfaces has a form that is asymmetric in a direction perpendicular to the primary scanning direction.

8. The imaging device array according to claim 1, wherein the plurality of reflective surfaces are arranged to have angles that satisfy the total reflection condition to all of the light rays contributing to imaging.

9. A method of receiving light from an object surface and directing the light to an image surface, comprising:
   providing a monolithic body having a plurality of imaging devices arrayed in a row in a primary scanning direction therewith, each of the plurality of imaging devices including:
   an incidence surface through which light rays are condensed in both the primary scanning direction and a secondary scanning direction perpendicular to the primary scanning direction,
   a plurality of reflective surfaces including first, second, third, and fourth reflective surfaces for reflecting the light received at the incidence surface, wherein the incidence surface, and the first and second reflective surfaces, focus the light rays on a middle of the imaging device, and the second and third reflective surfaces each has a shape that is asymmetric in a direction perpendicular to the primary scanning direction, and
   an exit surface that condenses the light rays in the primary and secondary scanning directions;
   forming a protrusion on at least one outer surface of the monolithic body, wherein the protrusion has a flattened outermost surface bounded by opposed sidewalls extending outwardly from the monolithic body; and
   receiving the light rays at the incidence surface which is reflected by the plurality of reflective surfaces to the exit surface,
   wherein the light rays entering each protrusion at an angle greater than a desired angle do not reach the exit surface.

10. The method of claim 9, wherein the maximum angle from perpendicular to each of the plurality of reflective surfaces that the light rays may enter and leave is $\theta max$ in the primary scanning direction in the view from a reflective surface direction, each protrusion has a width W in the primary scanning direction, and has a height L, where $\tan \theta max = W/2/L$.

11. The method of claim 9, further including the step of coating both surfaces of the sidewalls of each protrusion with a light absorbent material.

* * * * *